(12) United States Patent
Erhel

(10) Patent No.: US 9,714,862 B2
(45) Date of Patent: Jul. 25, 2017

(54) AIRCRAFT SEAT

(71) Applicant: BOMBARDIER INC., Dorval (CA)

(72) Inventor: Philippe Erhel, Montréal (CA)

(73) Assignee: BOMBARDIER INC., Dorval, Quebec (CA)

(\*) Notice: Subject to any disclaimer, the term of this patent is extended or adjusted under 35 U.S.C. 154(b) by 210 days.

(21) Appl. No.: 14/497,820

(22) Filed: Sep. 26, 2014

(65) Prior Publication Data

US 2015/0008709 A1 Jan. 8, 2015

Related U.S. Application Data

(63) Continuation-in-part of application No. 13/646,279, filed on Oct. 5, 2012, now Pat. No. 9,073,453.

(60) Provisional application No. 61/544,686, filed on Oct. 7, 2011, provisional application No. 61/646,456, filed on May 14, 2012.

(51) Int. Cl.
*G01G 19/44* (2006.01)
*B64D 11/06* (2006.01)
*G01G 19/414* (2006.01)

(52) U.S. Cl.
CPC .......... *G01G 19/44* (2013.01); *B64D 11/064* (2014.12); *B64D 11/0636* (2014.12); *B64D 11/0641* (2014.12); *G01G 19/4142* (2013.01); *Y02T 50/46* (2013.01)

(58) Field of Classification Search
CPC ... B64D 11/06; B64D 11/064; B64D 11/0641; B64D 11/0601
USPC ....... 297/340, 316, 115, 118, 188.16, 344.24
See application file for complete search history.

(56) References Cited

U.S. PATENT DOCUMENTS

| | | | |
|---|---|---|---|
| 1,663,898 A | 3/1928 | Bitzenburger | |
| 2,309,735 A | 2/1943 | Koch et al. | |
| 2,616,483 A | 11/1952 | Jensen | |
| 3,718,365 A | 2/1973 | Gibson | |
| 4,595,236 A | 6/1986 | Rizzoli | |
| 4,625,934 A * | 12/1986 | Ryan | B64D 11/06 244/122 R |
| 4,637,652 A | 1/1987 | Bergenwall | |

(Continued)

FOREIGN PATENT DOCUMENTS

| | | |
|---|---|---|
| DE | 1630538 A1 | 6/1971 |
| DE | 19853156 A1 | 5/2000 |

(Continued)

OTHER PUBLICATIONS

International Search Report and Written Opinion dated Jan. 19, 2016, for International Patent Application No. PCT/US2015/051971.

(Continued)

*Primary Examiner* — Sarah McPartlin
(74) *Attorney, Agent, or Firm* — Karceski IP Law, PLLC

(57) ABSTRACT

A vehicle seat includes a seat pan, where the seat pan front edge defines a first pivot point and the seat pan rear edge defines a second pivot point. A swivel is disposed beneath and supporting the seat, permitting the seat to rotate about a pivotal axis. First and second armrests are disposed on either side of the seat pan. A first control is positioned in the first armrest to lock and unlock movement of the seat in at least one of lateral and longitudinal directions. A second control is positioned in the second armrest to lock and unlock at least the swivel.

25 Claims, 25 Drawing Sheets

P1 - BACKREST PIVOT POINT LOCATION
P2 - SEAT PAN PIVOT POINT LOCATION
F - TAXI TAKEOFF & LANDING (TT&L)
G - LIMITED RECLINE
H - NAP
I - SLEEP

(56) References Cited

U.S. PATENT DOCUMENTS

| | | | |
|---|---|---|---|
| 5,161,765 A | 11/1992 | Wilson | |
| 5,568,960 A | 10/1996 | Oleson et al. | |
| 5,725,277 A | 3/1998 | Knoblock | |
| 5,795,025 A | 8/1998 | Murphy | |
| 5,860,701 A | 1/1999 | Jungjohann et al. | |
| 5,868,467 A | 2/1999 | Moll | |
| 5,954,401 A | 9/1999 | Koch et al. | |
| 6,000,659 A | 12/1999 | Brauer | |
| 6,000,755 A | 12/1999 | Uhlenbrock | |
| 6,227,489 B1 | 5/2001 | Kitamoto et al. | |
| 6,237,994 B1 | 5/2001 | Bentley et al. | |
| 6,402,244 B1 | 6/2002 | Schonenberg et al. | |
| 6,439,661 B1 | 8/2002 | Brauning | |
| 6,543,848 B1 | 4/2003 | Suga et al. | |
| 6,557,919 B2 | 5/2003 | Suga et al. | |
| 6,616,099 B2 | 9/2003 | Sankrithi | |
| 6,624,773 B2 | 9/2003 | Wong | |
| 6,691,970 B1 | 2/2004 | Sutton, Sr. | |
| 6,769,739 B2 | 8/2004 | Salzer et al. | |
| 6,776,454 B1 | 8/2004 | Aubert et al. | |
| 6,808,097 B2 | 10/2004 | Kim et al. | |
| 6,808,234 B2 | 10/2004 | Bauer et al. | |
| 6,929,320 B2 | 8/2005 | Laurent | |
| 6,949,904 B2* | 9/2005 | Rumney | B60N 2/002 318/286 |
| 7,090,296 B2 | 8/2006 | Massimo | |
| 7,100,985 B2 | 9/2006 | Wagner et al. | |
| 7,108,325 B2 | 9/2006 | Williamson et al. | |
| 7,108,326 B2 | 9/2006 | Schurg | |
| 7,114,781 B2 | 10/2006 | Costaglia | |
| 7,182,402 B1 | 2/2007 | Ahad | |
| 7,204,554 B2 | 4/2007 | Wieclawski | |
| 7,364,234 B2 | 4/2008 | Begin et al. | |
| 7,377,467 B2 | 5/2008 | Saint-Jalmes | |
| 7,427,102 B2 | 9/2008 | Wagner et al. | |
| 7,517,014 B2 | 4/2009 | Schroeder et al. | |
| 7,533,930 B1 | 5/2009 | Fissette et al. | |
| 7,568,765 B2 | 8/2009 | Brauning | |
| 7,578,470 B2 | 8/2009 | Plant | |
| 7,699,400 B2 | 4/2010 | Speh et al. | |
| 7,950,740 B2 | 5/2011 | Bunea et al. | |
| 8,025,334 B2 | 9/2011 | Schmitz et al. | |
| 8,267,472 B2 | 9/2012 | Large et al. | |
| 8,313,059 B2* | 11/2012 | Ferry | B60N 2/206 244/118.6 |
| 8,313,060 B2 | 11/2012 | Darbyshire | |
| 8,585,146 B1* | 11/2013 | Giasson | B60N 2/0747 297/344.1 |
| 8,783,770 B2 | 7/2014 | Tanaka et al. | |
| 8,998,329 B2 | 4/2015 | Becker et al. | |
| 2002/0149247 A1 | 10/2002 | Diffrient | |
| 2003/0080699 A1 | 5/2003 | Rumney | |
| 2003/0085597 A1 | 5/2003 | Ludeke et al. | |
| 2003/0189370 A1 | 10/2003 | Hemmer et al. | |
| 2006/0108848 A1 | 5/2006 | Williamson et al. | |
| 2006/0186715 A1 | 8/2006 | Schweizer | |
| 2007/0069563 A1 | 3/2007 | Herzog | |
| 2008/0005843 A1 | 1/2008 | Lokhorst et al. | |
| 2008/0007101 A1 | 1/2008 | Abt et al. | |
| 2008/0009958 A1 | 1/2008 | Abt et al. | |
| 2008/0018153 A1 | 1/2008 | Forgatsch et al. | |
| 2008/0088166 A1 | 4/2008 | Gardiner et al. | |
| 2008/0093502 A1 | 4/2008 | Bettell | |
| 2008/0121757 A1 | 5/2008 | Pozzi et al. | |
| 2008/0197677 A1 | 8/2008 | Nivet | |
| 2009/0015047 A1 | 1/2009 | Baumann | |
| 2009/0021065 A1 | 1/2009 | Brauning | |
| 2009/0108653 A1 | 4/2009 | Fissette et al. | |
| 2009/0195039 A1 | 8/2009 | Fujita et al. | |
| 2009/0195040 A1 | 8/2009 | Birbeck | |
| 2009/0295209 A1 | 12/2009 | Lee | |
| 2009/0302158 A1 | 12/2009 | Darbyshire et al. | |
| 2009/0319086 A1 | 12/2009 | Kramer | |
| 2010/0032994 A1 | 2/2010 | Lawson | |
| 2010/0032999 A1 | 2/2010 | Petitpierre | |
| 2010/0109387 A1 | 5/2010 | Merensky | |
| 2010/0176632 A1* | 7/2010 | Alford | B60N 2/0228 297/217.3 |
| 2010/0201172 A1 | 8/2010 | Hudswell et al. | |
| 2010/0253123 A1 | 10/2010 | DeCraene et al. | |
| 2010/0308164 A1 | 12/2010 | McKeever | |
| 2011/0049960 A1 | 3/2011 | Ferguson et al. | |
| 2011/0084527 A1 | 4/2011 | Marini et al. | |
| 2012/0074751 A1 | 3/2012 | De La Garza et al. | |
| 2013/0161990 A1 | 6/2013 | Oleson | |
| 2014/0191081 A1 | 7/2014 | Ward et al. | |

FOREIGN PATENT DOCUMENTS

| | | |
|---|---|---|
| EP | 0353210 | 1/1990 |
| EP | 0670241 A1 | 9/1995 |
| EP | 0808740 A2 | 11/1997 |
| EP | 1366987 | 12/2003 |
| EP | 1598270 A2 | 11/2005 |
| EP | 2213504 A2 | 8/2010 |
| EP | 2272711 B1 | 6/2011 |
| EP | 2353926 A1 | 8/2011 |
| EP | 1495908 B2 | 9/2011 |
| EP | 2289734 B1 | 10/2011 |
| EP | 2671752 A1 | 12/2013 |
| FR | 2776586 A1 | 10/1999 |
| FR | 2898312 A1 | 9/2007 |
| GB | 2362095 | 11/2001 |
| GB | 2362095 A | 11/2001 |
| GB | 2454751 | 5/2009 |
| GB | 2496452 A | 5/2013 |
| JP | 2003033243 A | 2/2003 |
| JP | 2003252085 A | 9/2003 |
| JP | 2007261353 A | 10/2007 |
| JP | 2011073552 A | 4/2011 |
| WO | WO 9000360 | 1/1990 |
| WO | WO 2006021766 A1 | 3/2006 |
| WO | WO 2006041570 | 4/2006 |
| WO | WO 2008107689 A1 | 9/2008 |
| WO | WO 2012003096 | 1/2012 |
| WO | WO 2012053022 A1 | 4/2012 |
| WO | WO 2012135250 A1 | 10/2012 |
| WO | WO 2014064525 A2 | 5/2014 |
| WO | WO 2014115106 A1 | 7/2014 |
| WO | WO 2014147449 A1 | 9/2014 |

OTHER PUBLICATIONS

International Search Report and Written Opinion dated Jan. 20, 2016, for International Patent Application No. PCT/US2015/052012.

International Search Report and Written Opinion dated Jan. 4, 2016, for International Patent Application No. PCT/US2015/052002.

Search Report dated Mar. 25, 2015, for United Kingdom Patent Application No. 1417017.9.

Search Report dated Mar. 25, 2015, for United Kingdom Patent Application No. 1417014.6.

Search Report dated Mar. 25, 2015, for United Kingdom Patent Application No. 1417012.0.

Search Report dated Mar. 25, 2015, for United Kingdom Patent Application No. 1417009.6.

International Search Report and Written Opinion dated May 2, 2016, for International Patent Application No. PCT/US2015/052021.

International Search Report and Written Opinion dated May 2, 2016, for International Patent Application No. PCT/US2015/051991.

International Search Report and Written Opinion dated Nov. 5, 2015, for International Patent Application No. PCT/US2015/051996.

* cited by examiner

AIRCRAFT SEAT

CROSS-REFERENCE TO RELATED APPLICATION(S)

This U.S. Non-Provisional patent application is a continuation-in-part patent application ("CIP") of U.S. patent application Ser. No. 13/646,279, entitled "AIRCRAFT SEAT," filed on Oct. 5, 2012. This patent application also relies for priority on U.S. Provisional Patent Application Ser. No. 61/544,686, entitled "AIRCRAFT SEAT," filed Oct. 7, 2011, and U.S. Provisional Patent Application Ser. No. 61/646,456, entitled "AIRCRAFT SEAT," filed May 14, 2012. The entire contents of all of the priority patent applications are hereby incorporated by reference in their entirety.

FIELD OF THE INVENTION

The present invention concerns a vehicle seat. Specifically, the present invention concerns a construction for an aircraft passenger seat.

DESCRIPTION OF THE RELATED ART

There are a wide variety of aircraft seats that have been incorporated into aircraft known in the prior art.

The prior art is replete with seats displaying a wide variety of different features and characteristics.

For example, U.S. Pat. No. 7,427,102 (hereinafter "the '102 patent") describes an aircraft seat with various articulation points that permit the seat to be adjusted into a number of different configurations. (The '102 patent at FIG. 3; see also the '102 patent at col. 6, lines 29-62.)

U.S. Pat. No. 7,108,326 (hereinafter "the '326 patent") describes an aircraft seat that reclines by lowering a rear end of the seat while maintaining the front end of the seat at a constant height. (The '326 patent at FIG. 2A and 2B; see also the '326 patent at col. 4, lines 38-42.)

U.S. Pat. No. 6,769,739 (hereinafter "the '739 patent") describes a seat that is adjustable based on a parallelogram defined by the seat frame. In the prone position, the seat forms an angle of about 15 degrees with respect to the floor of the aircraft. (The '739 patent at col. 6, lines 12-16.)

U.S. Pat. No. 6,402,244 (hereinafter "the '244 patent") describes a seat for an aircraft that has a single tilt axis 17, beneath the seat, that permits the entirety of the seat to tilt from a vertical position. (The '244 patent at col. 4, lines 4-6.) The tilt axis is positioned in a range of 30% to 70% of the depth of the seating surface. (The '244 patent at col. 4, lines 10-15.)

Great Britain Patent No. 2 363 095 (hereinafter "the GB '095 patent") describes an aircraft seat that may be oriented in a seating posting and in a horizontal position. The rear of the seating surface may be lower than a front edge of the seating surface. (The GB '095 patent at page 12, lines 10-16.)

U.S. Patent Application Publication No. 2009/0185039 (hereinafter "the '039 application") describes a seat with a number of positions, which are illustrated in FIG. 1 of that patent application.

U.S. Patent Application Publication No. 2008/0093502 (hereinafter "the '502 application") describes an aircraft seat that transitions from a reclined position to a horizontal position. (The '501 application at FIGS. 5 and 6.)

U.S. Patent Application Publication No. 2008/0009958 (hereinafter "the '958 application") illustrates an aircraft with a number of seats therein, the seats being controllable within a predetermined, limited space within the aircraft.

U.S. Pat. No. 7,517,014 (hereinafter "the '014 patent") describes a storage compartment for an aircraft seat where the storage compartment is beneath the seat and is accessible by lifting the seat cushion.

U.S. Pat. No. 6,808,234 (hereinafter "the '234 patent") describes a seat that can transition from an upright position to a horizontal position. (The '234 patent at col. 2, lines 14-22; see also the '234 patent at FIGS. 1 and 4.) The armrest is maintained in a position parallel to the surface of the seat. (The '234 patent at col. 2, lines 5-6.) The armrest lowers as the seat transitions to a horizontal configuration from the upright configuration.

U.S. Pat. No. 5,795,025 (hereinafter "the '025 patent") describes an armrest for a seat that is adjustable in height relative to the adjacent seat.

U.S. Patent Application Publication No. 2003/0885597 (hereinafter "the '597 application") describes an aircraft seat with a control panel 200 embedded in the armrest. (The '597 application at paragraph [0022].) The armrest may be raised and lowered via a toggle switch 206. (The '597 application at paragraph [0026].)

U.S. Patent Application Publication No. 2006/0186715 (hereinafter "the '715 application") describes a seating unit with a control device in the armrest. (The '715 application at FIG. 2.) The armrest may be lowered obliquely as the inclination of the backrest increases. (The '715 application at paragraph [0017].)

U.S Patent Application Publication No. 2008/0018153 (hereinafter "the 153 application") describes an aircraft seat with variable pre-tension for the backrest portion of the seat. (The '153 application at paragraph [0005].)

U.S. Pat. No. 6,000,755 (hereinafter the '755 patent") describes an office chair that pivots at a point 43 near to the front of the chair. The seat and backrest are spring-biased (torsion element 44) into an upright position. (The '755 patent at col. 3, lines 41-55.)

Japanese Patent Publication No. 2003-033243 (hereinafter "JP'243") appears to describe a passenger seat that is adjustable for different passenger sizes by controlling the positioning of the seat plate 7. (JP'243 at the Abstract and translation of the claims.)

U.S. Pat. No. 4,595,236 (hereinafter "the '236 patent") describes a chair with a weight-responsive spring that adjusts automatically based on the weight of the occupant.

U.S. Pat. No. 7,950,740 (hereinafter "the '740 patent") describes a swivel for a seat with a disk brake locking mechanism.

U.S. Pat. No. 6,000,659 (hereinafter "the '659 patent") describes a seat with a drive screw that slides (or translates) the seat away from an adjacent bulkhead when the seat is rotated from a forward-facing, upright position to a laterally-facing sleeping position. (The '659 patent at col. 5, lines 14-18.)

U.S. Pat. No. 7,108,325 (hereinafter "the '325 patent") describes a seat construction that includes two sets of parallel rods and a swivel that cooperate to permit both translational and rotational motion for the seat. (The '325 patent at col. 3, lines 24-29.)

U.S. Pat. No. 5,568,960 (hereinafter "the '960 patent") describes a locking mechanism for an aircraft seat.

U.S. Pat. No. 7,364,234 (hereinafter "the '234 patent") describes a swivel mechanism for a chair on a boat. The swivel includes an eccentric swivel mount 18 that allows the seat to be translated away from an adjacent bulkhead wall when the seat is rotated. (The '234 patent at col. 2, line 66, through col. 3, line 3.)

U.S. Pat. No. 7,114,781 (hereinafter "the '781 patent") describes a control panel for a seat that is mounted in the armrest of the office chair. One button controls the height of the seat while the other controls the backrest of the office chair. (The '781 patent at col. 5, lines 1-20.)

U.S. Pat. No. 6,949,904 (hereinafter "the '904 patent") describes a power actuated seat that provides control over the leg rest, backrest, and lumbar support provided by the seat. (The '904 patent at col. 4, lines 13-16.)

U.S. Patent Application Publication No. 2010/0176632 (hereinafter "the '632 application") describes a touch-sensitive interface for control over the position of a seat.

U.S. Patent Application Publication No. 2003/0080699 (hereinafter "the '699 application") describes a control methodology for controlling the configuration of a seat. (The '699 patent at FIG. 4A.)

U.S. Patent Application Publication No. 2010/032999 (hereinafter "the '999 application") describes a control schematic for control over the configuration of a passenger seat. (The '999 application at FIG. 2.)

These patents and patent applications are listed to provide a general context of the various aspects of seats known in the prior art.

SUMMARY OF THE INVENTION

The present invention seeks to improve upon seats that are known in the prior art by introducing and combining a number of new and unique features, which are detailed in the paragraphs that follow.

As such, the present invention provides a vehicle seat that includes a seat pan, having a seat pan front edge and a seat pan rear edge, where the seat pan front edge defines a first pivot point and the seat pan rear edge defines a second pivot point. The seat also includes a backrest, having a backrest top edge and a backrest bottom edge, where the backrest bottom edge is articulately disposed adjacent to the seat pan rear edge and a headrest, having a headrest top edge and a headrest bottom edge, where the headrest bottom edge is articulately disposed adjacent to the backrest top edge. The seat pan, the backrest, and the headrest are positionable with respect to one another such that the seat is configurable into at least one of a taxi, takeoff and landing position, a napping position, and a sleeping position. A swivel is disposed beneath and supporting the seat, permitting the seat to rotate about a pivotal axis. First and second armrests disposed on either side of the seat pan. A first control is positioned in the first armrest, the first control being provided to lock and unlock movement of the seat in at least one of lateral and longitudinal directions. A second control positioned in the second armrest, the second control being provided to lock and unlock at least the swivel.

In one further contemplated embodiment, the first pivot point remains in a substantially fixed position for the taxi, takeoff and landing position, the napping position, and the sleeping position.

In another contemplated embodiment, the seat include a third control positioned beneath the seat pan, the third control being a manual override.

In still another embodiment, the seat includes a lumbar cushion, with a lumbar cushion top edge and a lumbar cushion bottom edge, wherein the lumbar cushion bottom edge is articulately disposed adjacent to the seat pan rear edge and the lumbar cushion top edge is articulately disposed adjacent to the backrest bottom edge.

In one contemplated embodiment, at least one of the first and second controls also lock and unlock a recline mechanism that permits adjustment of a recline position.

In another contemplated embodiment, the second control also locks and unlocks the recline mechanism.

Still further, it is contemplated that the first and second controls are finger-actuated levers.

In one variation, the first and second controls are electrical switches.

In another variation, the third control is a foot-actuated lever.

The present invention also provides a vehicle seat that includes a pressure sensor disposed at least within the seat pan, the pressure sensor being configured to detect a weight of an occupant of the seat.

Where the seat includes a pressure sensor, the present invention provides a method of operation of the seat that includes detecting the weight of the occupant, detecting if the aircraft is in a taxi, takeoff, and landing mode of operation, and, if the aircraft is not in the taxi, takeoff, and landing mode of operation, receiving input from the second control, thereby permitting the seat to transition from the taxi, takeoff and landing position to the napping position, or any position intermediate thereto.

In one contemplated embodiment, the method also includes locking the seat when the weight of the occupant fails to exceed a minimum threshold weight.

It is contemplated that the method also includes, if the aircraft is not in the taxi, takeoff, and landing mode of operation, receiving input from the second control, thereby permitting the seat to swivel.

In one contemplated embodiment, the method includes, if the aircraft is not in the taxi, takeoff, and landing mode of operation, receiving input from the first control, thereby permitting the seat to move at least one of laterally or longitudinally with respect to a centerline of the aircraft.

The present invention also provides a method where, if the aircraft is not in the taxi, takeoff, and landing mode of operation, input is received from the third control, thereby permitting the seat to transition to the sleeping position.

In still another embodiment, the present invention provides a method of operating a seat for an aircraft with a control connected to a pressure sensor disposed at least within a seat pan, the pressure sensor being configured to detect a weight of an occupant of the seat. The method includes detecting the weight of the occupant by the pressure sensor, detecting if the aircraft is in a taxi, takeoff, and landing mode of operation, and, if the aircraft is not in the taxi, takeoff, and landing mode of operation, receiving input from the control, thereby permitting the seat to transition from a taxi, takeoff and landing position to a napping position or any position intermediate thereto.

In another contemplated embodiment, the method includes locking the seat when the weight of the occupant fails to exceed a minimum threshold weight.

In a further embodiment, if the aircraft is not in the taxi, takeoff, and landing mode of operation, the method also includes receiving input from the control, thereby permitting the seat to swivel.

Still further, if the aircraft is not in the taxi, takeoff, and landing mode of operation, the method may include receiving input from the control, thereby permitting the seat to move at least one of laterally or longitudinally with respect to a centerline of the aircraft.

In addition, if the aircraft is not in the taxi, takeoff, and landing mode of operation, the method may receive input from the control, thereby permitting the seat to transition to the sleeping position.

Still further aspects of the present invention will be made apparent from the discussion provided below.

BRIEF DESCRIPTION OF THE DRAWINGS

The present invention will now be described in connection with the drawings appended hereto, in which.

DETAILED DESCRIPTION OF EMBODIMENT(S) OF THE INVENTION

Figure 1:
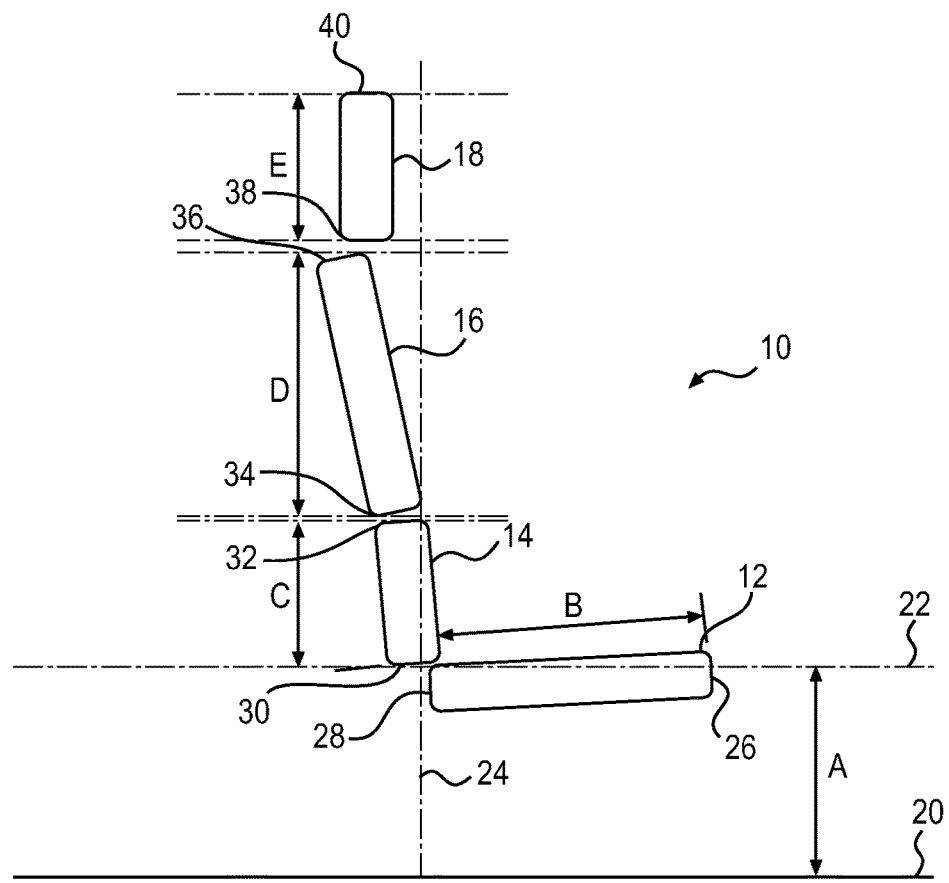
FIG. 1 is a side view, graphical illustration of a first embodiment of a seat for an aircraft according to the present invention, showing the seat in the taxi, take-off, and landing position.

The present invention will now be described in connection with one or more contemplated embodiments. The embodiments that are described are intended to be exemplary of the present invention and not limiting of the scope thereof. In other words, while attention is focused on specific embodiments of the present invention, those embodiments are not intended to limit the present invention. To the contrary, the examples provided below are intended to illustrate the broad scope of the present invention.

In the paragraphs that follow, the present invention will be described in connection with an aircraft seat 10. While the details of the aircraft seat 10 of the present invention are discussed in connection with the use of the seat 10 in an aircraft, it is contemplated that the seat 10 of the present invention may be employed in any number of suitable environments without departing from the scope of the present invention. For example, the seat 10 of the present invention may be used on a boat, bus, recreational vehicle, or train, among other contemplated vehicles and environments.

In addition, the discussion that follows will identify specific materials from which the aircraft seat 10 may be constructed. Any identification of a specific material is intended to be exemplary of the types of materials that may be employed to construct the present invention. As such, any discussion of specific materials is not intended to be limiting of the present invention.

With respect to the seat 10, there are a number of different aspects and features that are considered to be a part of the present invention. The specific features and aspects may be combined together or used singly on a seat without departing from the scope of the present invention. In other words, the seat of the present invention need not incorporate all of the features described herein.

With respect to aircraft, there are a number of different aircraft types that are known in the art. For example, there are commercial aircraft, with which the public is generally familiar. In addition, there are genres of business and private aircraft that are designed for private use, for charter use, or for hire operations.

The seat 10 of the present invention has been designed and sized for use on business, private, charter, and for-hire aircraft. While designed with business, private, charter, and for-hire aircraft in mind, the seat 10 may be sized for any type of aircraft, including commercial aircraft, without departing from the scope of the present invention.

In the paragraphs that follow, there are at least six separate and distinct aspects of the present invention upon which focus is made. The first aspect encompasses generally the different positions of a seat for an aircraft. The second aspect concerns specific storage compartments that are incorporated into the armrests for a seat on an aircraft. A third aspect concerns an adjustability of the seat with respect to armrests adjacent thereto. A fourth aspect of the present invention addresses weight-responsive control for the seat. A fifth aspect concerns a swivel motion for the seat when the seat transitions from a forward-facing direction to an inboard-facing direction within the aircraft. A sixth aspect of the present invention concerns a control scheme for a seat on an aircraft. While these six aspects of the present invention are discussed below, the present invention is not intended to be limited to these six aspects. There are numerous other aspects of the present invention that are also described herein.

For reference, it is noted that an aircraft has a longitudinal axis that defines the forward and aft (or rear) locations on the plane. The starboard (or right side) and port (or left side) of the aircraft are defined with respect to the longitudinal axis. For purposes of the present invention the term "longitudinal" is employed when referring to a direction consistent with the longitudinal axis of the aircraft. The term "lateral" is employed when referring to the port and starboard locations within the aircraft. The use of these terms is intended to provide context. However, the use of these terms is not intended to be limiting of the present invention.

FIG. 1 is a side view schematic of one embodiment of an aircraft seat according to the present invention. This side view of the seat 10 illustrates the seat pan 12, the lumbar cushion 14, the backrest 16, and the headrest 18, all of which cooperate to support a passenger that is seated therein. For reference, the floor 20 in an aircraft is illustrated. In addition, a horizontal reference line 22 and a vertical reference line 24 are provided.

When designing a seat 10 for an aircraft, the seat 10 will conform to specific dimensional requirements so that the seat 10 may be installed in an aircraft together with other seats, furniture, and interior items. As a result, seats 10 are limited to selected specifications.

In addition, when sizing any item that accommodates a human person, engineers take into account certain dimensions that are considered standard for a typical human being. With reference to the seat 10, the engineers sized the seat to accommodate a $50^{th}$ percentile male, which practice is common in the industry. A $50^{th}$ percentile male is a theoretical construct that approximates the dimensions of a male human being consistent with the $50^{th}$ percentile. In other words, ½ of the human population will be statistically larger than the $50^{th}$ percentile male and ½ of the human population will be statistically smaller than the $50^{th}$ percentile male.

Figure 2:
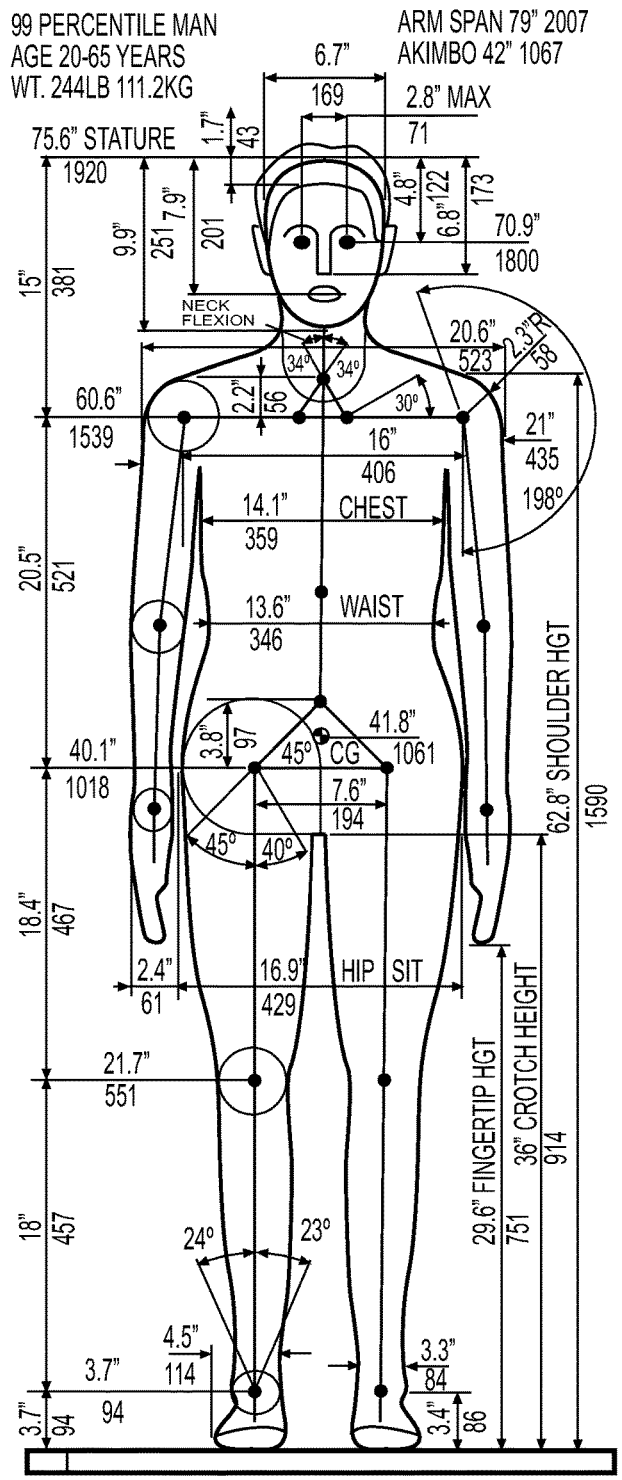
FIG. 2 is a graphical, front view of a theoretical construct for a 99$^{th}$ percentile human male.
Figure 3:
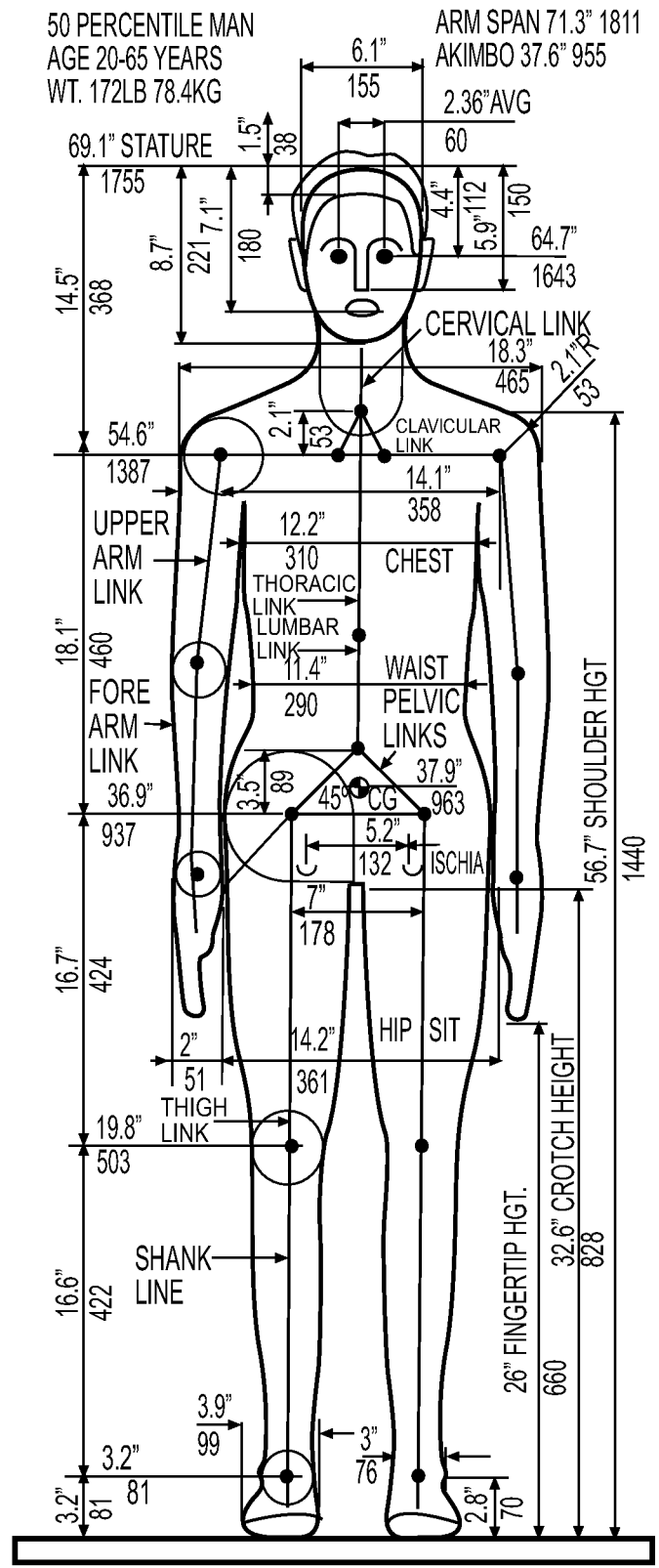
FIG. 3 is a graphical, front view of a theoretical construct for a 50$^{th}$ percentile human male.
Figure 4:
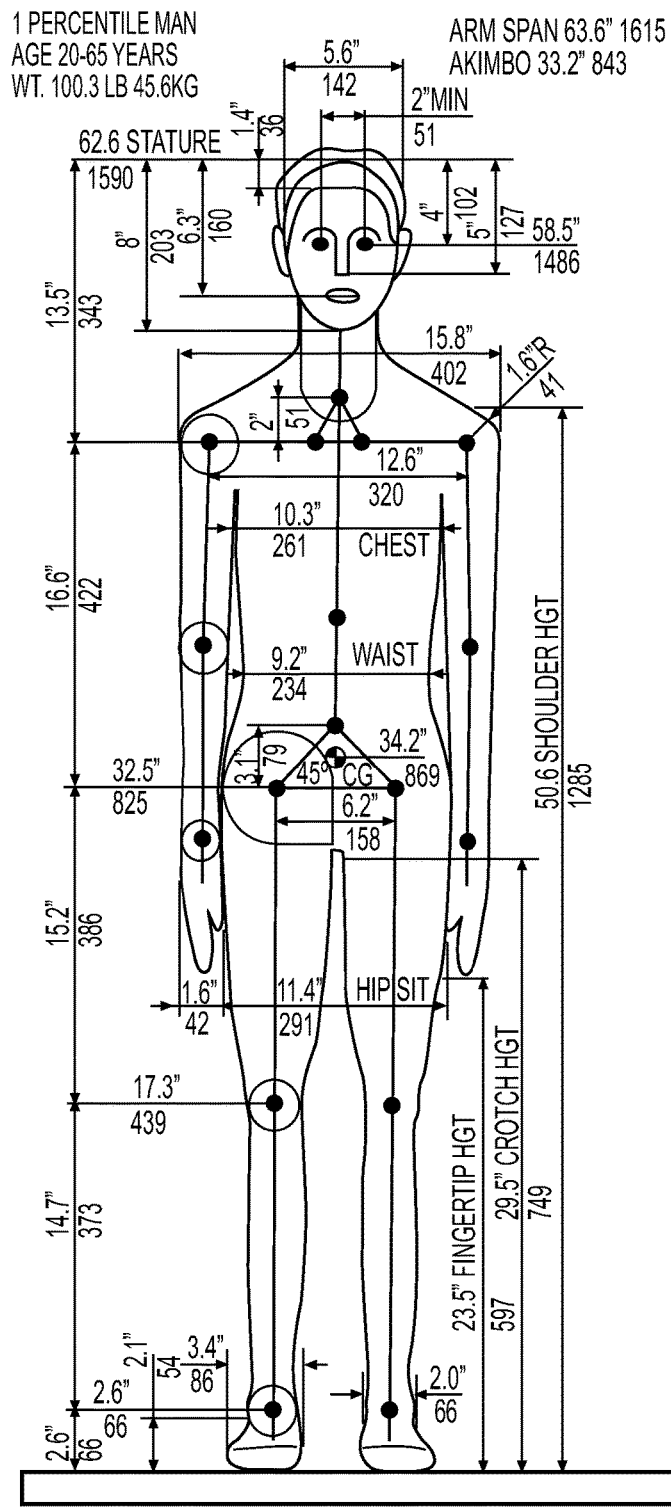
FIG. 4 is a graphical, front view of a theoretical construct for a 1$^{st}$ percentile human male.

For reference, a schematic illustration of one example of a $50^{th}$ percentile male is provided in FIG. 3. As should be apparent, the seat 10 may be designed to accommodate a larger or smaller person without departing from the present invention. As a basis for comparison with the dimensions of the $50^{th}$ percentile male, FIG. 2 provides the dimensions of a $99^{th}$ percentile male. FIG. 4 provides the dimensions of a $1^{St}$ percentile male. These figures were adopted from Tilley, Alvin R., "The Measure of Man & Woman," John Wiley & Sons, Publisher, 2002 (Revised Edition).

The seat 10 shown in FIG. 1 is contemplated to have a seat pan front edge height A of about 17 inches (43.18 cm). The seat pan front edge height A defines the height of the front edge of the seat pan 12 from the floor 20. The seat pan front edge height A is selected as 17 inches (43.18 cm) based upon the average person that is anticipated to occupy the seat. In an alternative embodiment, the seat 10 is contemplated to have a seat pan height A of about 18.25 inches (46.36 cm). This height also has been selected based upon the dimensions of the average person anticipated to occupy the seat. As a matter of design, ranges for the seat pan height A are contemplated to fall between about 16-19.25 inches (40.64-48.89 cm). Alternatively, ranges for the seat pan height A may fall between 15-20.25 inches (38.10-51.44 cm) without departing from the scope of the present invention. Further ranges for the seat pan front edge height A may be between about 16-18 inches (40.64-45.72 cm) and 17.25-19.25 inches (43.82-48.89 cm), respectively. In addition, further ranges for the seat pan height may be between 15-19 inches and 16.25-20.25 inches (41.28-51.43 cm), respectively.

The seat pan 12 defines a seat depth B that is about 18 inches (45.72 cm). The seat pan depth B is a measure of the depth of the seat pan 12 from the front edge to the rear edge, as illustrated. With respect to the seat pan depth B, a contemplated range for the seat pan depth B may be between about 17-19 inches (43.18-48.26 cm). A further range for the seat pan depth may be between about 16-20 inches (40.64-50.50 cm) without departing from the scope of the present invention.

As should be apparent from FIG. 1, the seat pan 12 defines a slightly angled surface, as compared to the horizontal reference line 22. Specifically, the front edge 26 of the seat pan 12 is slightly higher than the rear edge 28 of the seat pan. When the seat pan 12 is angled as illustrated, it is understood that a person will be more comfortably seated by comparison with a seat in which the seat pan 12 is disposed parallel to the horizontal reference line 22.

It is noted that the seat pan 12 will be supported by legs, a base, or a support frame (not shown) that connect to tracks (not shown) in the aircraft floor 20. The legs are not critical to operation of the present invention and, therefore, are omitted from the various, simplified figures that are presented herein. In addition, aircraft include securement tracks that are embedded in the floor of the cabin for attachment of furniture thereto. The tracks are omitted from the figures, as they are standard in the industry. Moreover, while the seat 10 may be connected to the aircraft floor 20 via tracks, this mechanism for securement is not needed to practice the present invention. The seat 10 may be secured by any suitable, alternative means.

The lumbar cushion 14 defines a third dimension of the seat 10 of the present invention. Specifically, the lumbar cushion 14 defines a lumbar cushion height C of about 8 inches (20.32 cm). With respect to the lumbar cushion height C, a range of dimensions may fall between about 7-9 inches (17.78-22.86 cm). In still a further alternative, the range of the lumbar cushion height C may be between about 6-10 inches (15.24-25.40 cm).

The lumbar cushion 14 is arranged adjacent to the rear edge 28 of the seat pan 12. The lumbar cushion 14 is angled slightly with respect to the vertical reference line 24. Specifically, the bottom edge 30 and the top edge 32 of the lumbar cushion 14 define an angle such that the top edge is offset a predetermined amount from the vertical reference line 24.

The backrest 16 defines a fourth dimension of the seat 10 of the present invention. In particular, the backrest 16 defines a backrest height D of about 16.5 inches (41.91 cm). With respect to the backrest height D, a range of dimensions may fall between about 15.5-17.5 inches (39.37-44.45 cm). In a further variation, the backrest height D may fall within a range of between about 14.5-18.5 inches (36.83-46.99 cm).

As with the lumbar cushion 14, the backrest 16 has a bottom edge 34 and a top edge 36. The backrest 16 also is angled with respect to the vertical reference line 24. Specifically, the top edge 36 is disposed a predetermined distance from the vertical reference line 24 by comparison with the position of the bottom edge 34 of the backrest 16.

The headrest 18 defines a fifth dimension of the seat 10 of the present invention. Here, the headrest 18 defines a headrest height E of about 7 inches (17.78 cm). With respect to the headrest height E, a range of dimensions may fall between about 6-8 inches (15.24-20.32 cm). In a further variation, the headrest height E may fall within a range between about 5-9 inches (12.70-22.86 cm).

The headrest 18 has a bottom edge 38 and a top edge 40. The headrest 18 is shown in an orientation that is essentially parallel to the vertical reference line 24. While a parallel orientation is illustrated in FIG. 1, it is contemplated that the headrest 18 may be angled with respect to the vertical reference lines 24 without departing from the scope of the present invention.

The orientations of the seat pan 12, the lumbar cushion 14, the backrest 16, and the headrest 18 are selected to provide conformable support for a seated person. In addition, the disposition of the various components of the seat 10 with respect to one another is contemplated to provide an enhanced level of comfort for the passenger.

Figure 5:
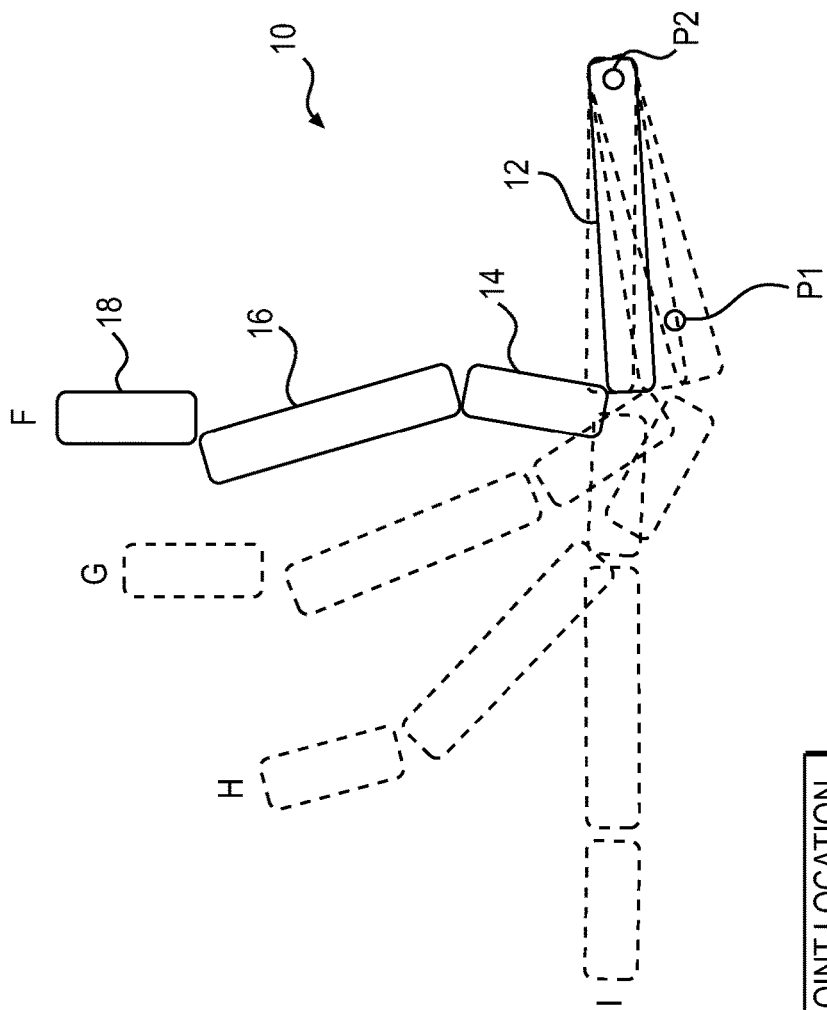
FIG. 5 is a graphical, side view of the first embodiment of the seat of the present invention, as shown in FIG. 1, illustrating the various positions of the seat.

FIG. 5 is a graphical, side view of the seat 10 according to the present invention, illustrating four primary seat positions F, G, H, I. "F" refers to the upright seat position that is also known as the taxi, takeoff, and landing position. As the name suggests, the TTL position F is the configuration of the seat 10 when the aircraft is taxiing on the ground, in takeoff mode, or in landing mode. "G" refers to a partially upright position that is also referred to as the "limited recline" position. "H" refers to a partially reclined position of the seat 10 that is also referred to as the "nap" position. "I" refers to a fully reclined position where the various elements of the seat 10 are parallel to the horizontal reference line 22.

With respect to FIG. 5, there are two additional points that are identified. The first is the back rest pivot point location P1. The second is the seat pan pivot point location P2. These two pivot points P1, P2 help to define the various positions F, G, H, I that are illustrated in FIG. 5. The various positions F, G, H, I are discussed in greater detail in the paragraphs that follow.

Figure 6:
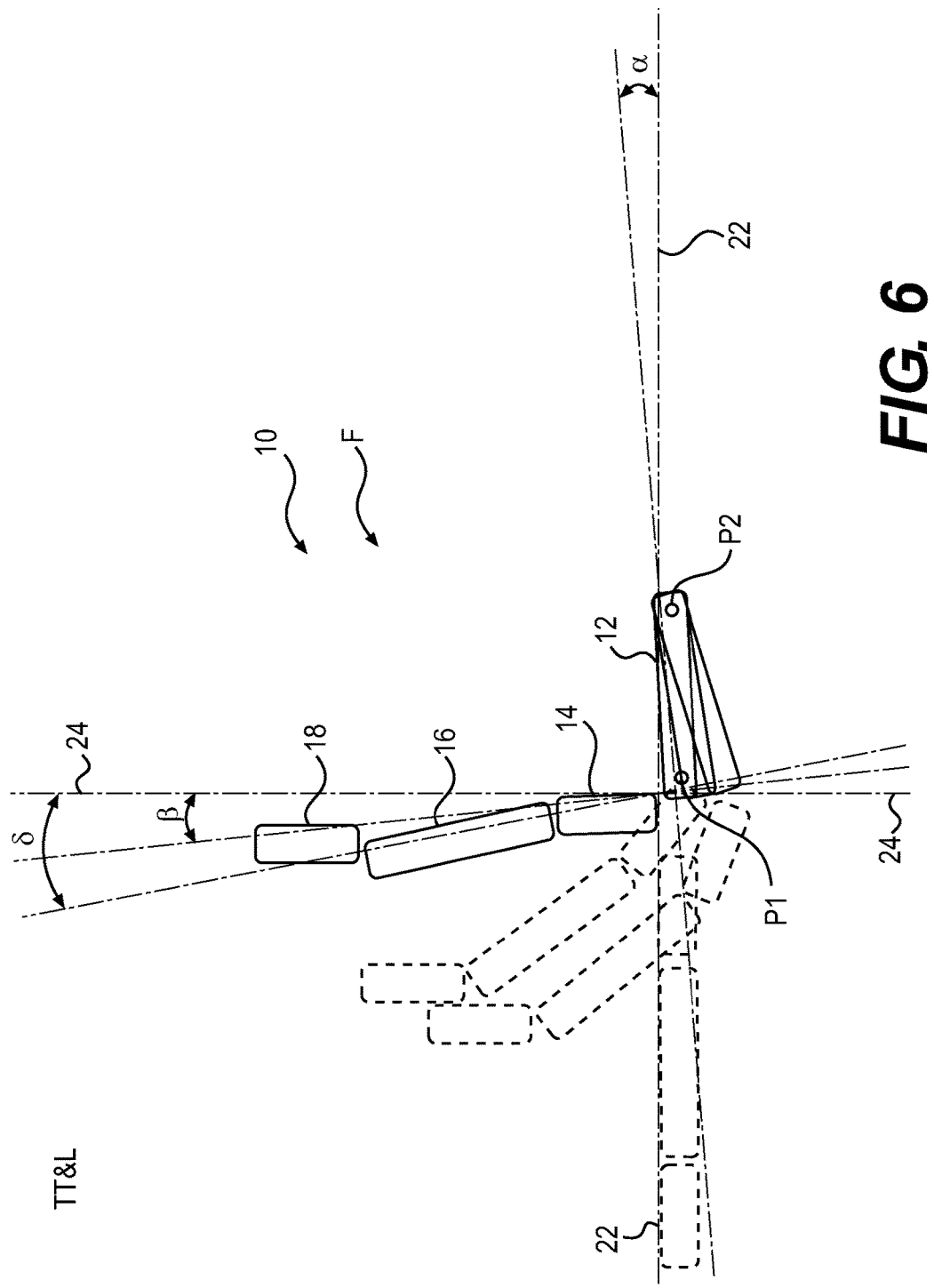
FIG. 6 is a graphical, side view of the seat shown in FIG. 1, with the seat being illustrated in the taxi, takeoff, and landing position.

FIG. 6 is a graphical, side view illustration of the seat 10 in the TTL position F. The horizontal reference line 22 and the vertical reference line 24 are included for reference. In FIGS. 6-9, the seat pan 12 defines an angle α with respect to the horizontal reference line 22. The lumbar cushion 14 defines an angle β with respect to the vertical reference line 24. The backrest 16 defines an angle δ with respect to the vertical reference line 24.

In the TTL position F, which is illustrated in FIG. 6, the angle α is approximately 3°, the angle β is approximately 4°, and the angle δ is approximately 12°. As should be appreciated by those skilled in the art, these angles are merely exemplary of one contemplated orientation for the TTL position F. In a broader aspect of the seat 10 of the present invention, the angle α is between about 1-5°, the angle β is between about 2-6°, and the angle δ is between about 10-14°. In a still broader embodiment, the angle α is between about 0-6°, the angle β is between about 0-8°, and the angle δ is between about 8-16°.

It is noted that the TTL position F is not likely to vary significantly from an almost entirely upright position, because there are aviation regulations that govern the seating position of passengers during taxi, takeoff, and landing. As a result, it is not possible to vary the TTL position F greatly without exceeding one or more of those aviation guidelines. The requirements for the TTL position F are understood to be known to those skilled in the art.

As should be apparent from FIG. 6, when the seat 10 is in the TTL position F, the seat pan 12, the lumbar cushion 14 and the backrest 16 are all angled with respect to the horizontal reference line 22 or the vertical reference line 24. This orientation is intentional. When the seat 10 is in the TTL position F, the seat pan 12 is angled such that the backrest pivot point location P1 is lower than the seat pan pivot point location P2. With this orientation, the seat 10 will be more comfortable to the occupant when the seat is in the TTL position F. Similarly, by angling the lumbar cushion 14 and the backrest 16 together with the seat pan 12, the seat 10 provides adequate back support for the occupant. In other words, the by angling the lumbar cushion 14 and the backrest 16 together with the seat pan 12, the seat 10 provides a comfortable arrangement for the occupant. The combination of the angles for the seat pan 12, the lumbar cushion 14, and the backrest cooperate to provide a more comfortable seating position for the occupant when the seat 10 is in the TTL position F.

Figure 7:
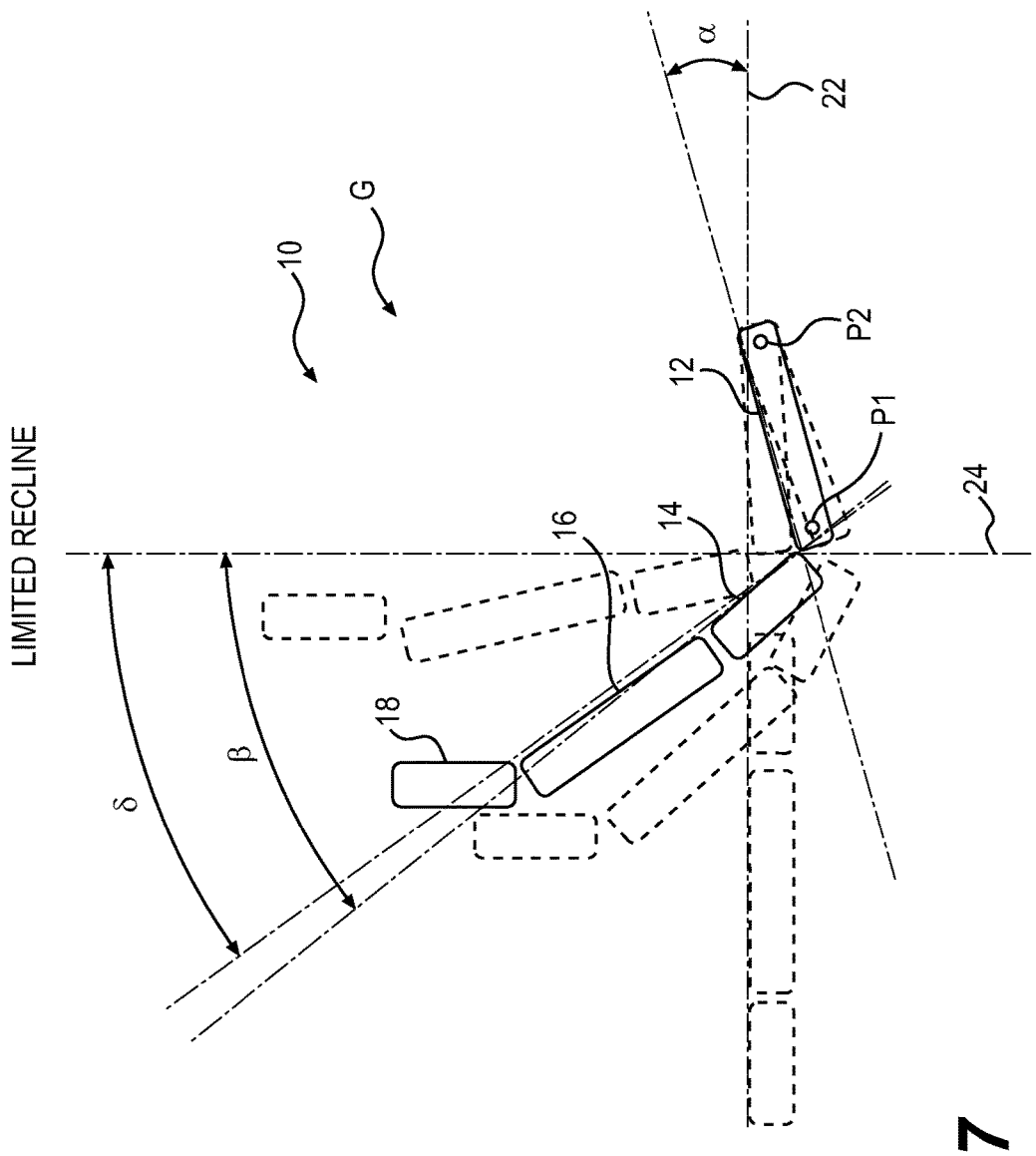
FIG. 7 is a graphical, side view of the seat shown in FIG. 6, with the seat being shown in a limited recline position.

In the limited recline position G, which is illustrated in FIG. 7, the angle α is approximately 15°, the angle β is approximately 40°, and the angle δ is approximately 35°. As should be appreciated by those skilled in the art, these angles are merely exemplary of one contemplated orientation for the limited recline position F. In a broader aspect of the seat 10 of the present invention, with respect to the limited recline position, the angle α is between about 13-17°, the angle β is between about 38-42°, and the angle δ is between about 33-37°. In a still broader embodiment, the angle α is between about 10-20°, the angle β is between about 35-45°, and the angle δ is between about 30-40°.

As should be apparent from FIG. 7, when the seat 10 is in the limited recline position G, the seat pan 12 forms a greater angle α with respect to the horizontal reference line 22 as compared with the TTL position F, described in connection with FIG. 6. In addition, the lumbar cushion 14 forms a greater angle β with respect to the vertical reference line 24. Similarly, the backrest 16 forms a greater angle δ with respect to the vertical reference line 24.

It should be understood that the limited recline position G presents a configuration for the seat 10 where the occupant is maintained in a partially vertical orientation. This configuration is intended to provide adequate back and head support. It is for this reason, among others, that the headrest 18 remains in a substantially vertical position with respect to the backrest 16.

Figure 8:
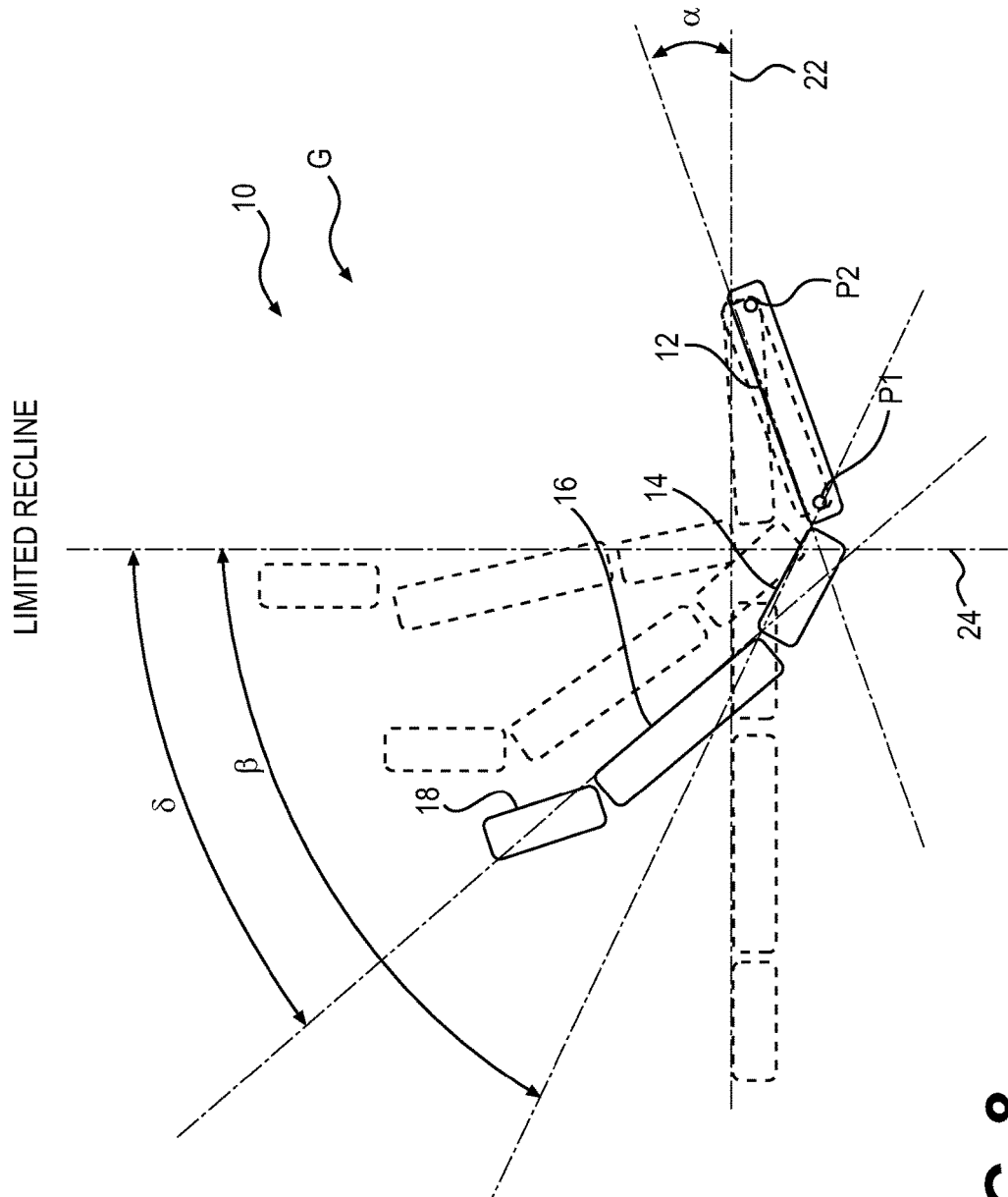
FIG. 8 is a graphical, side view of the seat shown in FIG. 6, with the seat being shown in a napping position.

In connection with the limited recline position G, it is noted that the seat pan pivot point location P2 has remained essentially unchanged from the location depicted for the TTL position F. This positioning is intentional. When a person is seated, the rear of the person's knees will be against the forward edge of the seat pan 12. Although the seat 10 may be adjusted to different positions, the person's lower leg position remains unchanged unless the person stretches out. As such, to maintain a comfortable position, the seat pan pivot location P2 is unchanged from the TTL position F to the limited recline position G In the nap position H, which is illustrated in FIG. 8, the angle α is approximately 20°, the angle β is approximately 63°, and the angle δ is approximately 40°. As should be appreciated by those skilled in the art, these angles are merely exemplary of one contemplated orientation for the nap position F. In a broader aspect of the seat 10 of the present invention, with respect to the nap position, the angle α is between about 18-22°, the angle β is between about 61-65°, and the angle δ is between about 38-42°. In a still broader embodiment, the angle α is between about 15-25°, the angle β is between about 58-68°, and the angle δ is between about 35-45°.

In the nap position H, the seat 10 is configured to establish a cradled orientation for the passenger. As a result, the seat pan 12, the lumbar cushion 14, and the backrest 16 are at even greater angular orientations as compared with the limited recline position G. As should be apparent in this illustration, the seat 10 has a substantially curved orientation.

In the nap position H, the seat pan pivot point location P2 remains at substantially the same position as in the TTL position F and the limited recline position G. Again, this is intentional. As discussed above, to properly support a person in the seat 10 and to maintain the person's lower legs in a suitable orientation, the seat pan pivot point P2 is maintained in a substantially constant position. This remains true for the nap position H.

In connection with the TTL position F, the limited recline position G, and the nap position H, the seat pan pivot point location remains relatively fixed in its displacement distance from the horizontal reference line 22. In other words, the seat pan pivot location P2 remains constant regardless of the particular seat position selected by the occupant. As discussed, this positioning is intentional. In each of the positions F, G, H, the person's legs remain unchanged in this disposition from the floor 20 of the cabin. As such, by maintaining the seat pan pivot location P2 in a fixed position, the occupant of the seat 10 will enjoy maximum comfort.

Figure 9:
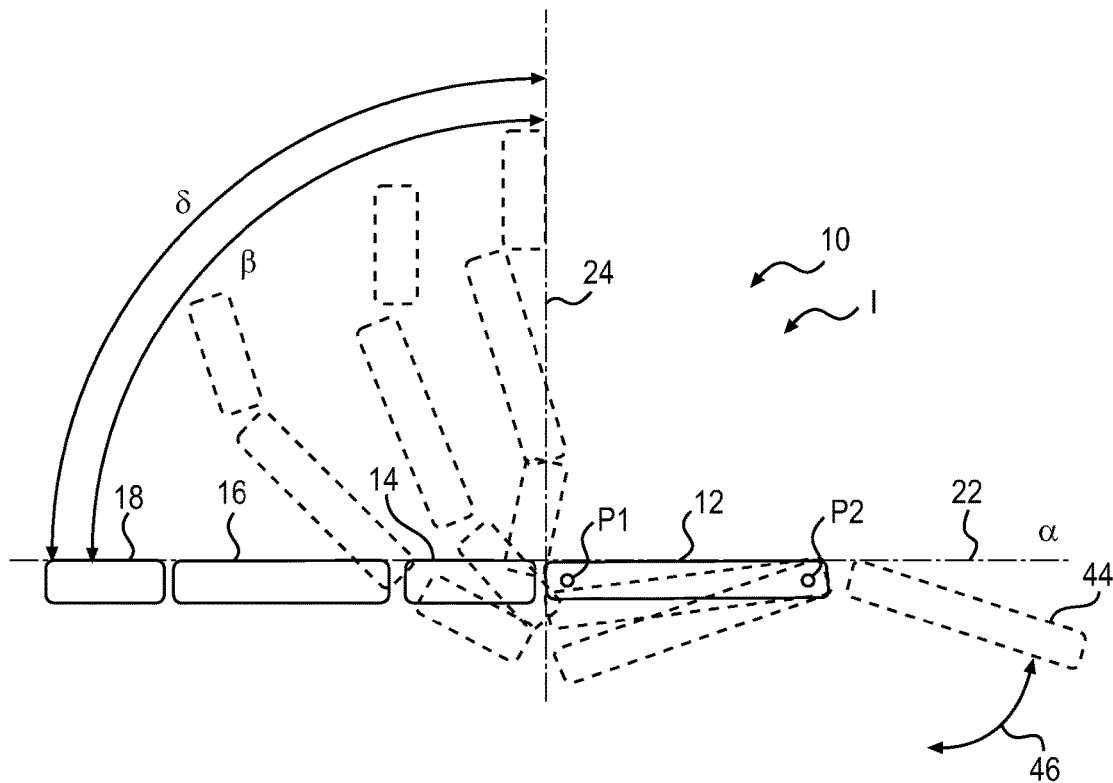
FIG. 9 is a graphical, side view of the seat shown in FIG. 6, with the seat being shown in a sleeping position.

In the sleep position I, which is illustrated in FIG. 9, the angle $\alpha$ is approximately 0°, the angle $\beta$ is approximately 90°, and the angle $\delta$ is approximately 90°. In other words, the seat pan 12, the lumbar cushion 14, the backrest 16, and the headrest 18 are aligned to establish a horizontal or substantially horizontal surface with respect to the horizontal line 22.

With respect to the sleep position, the seat pan 12, the lumbar cushion 14, the backrest 16, and the headrest 18, together, form a linear sleep surface 42. The linear sleep surface 42 need not be parallel to the horizontal reference line 22. To the contrary, the linear sleep surface 42 may be angled with respect to the horizontal reference line 22 by an angle $\alpha$ of—0-45°. More specifically, the linear sleep surface 42 may be disposed with respect to the horizontal reference line 22 by an angle $\alpha$ of—0-6°. Still further, the linear sleep surface 42 may be disposed from the horizontal reference line by an angle $\alpha$ of—2-5°, with a preferred angle being—3.5-4°. As should be apparent to those skilled in the art, other angles $\alpha$ may be selected for the linear sleep surface 42 without departing from the scope of the present invention.

It is noted that, when the angle $\alpha$ is negative, as indicated above, this means that the seat pan 12 angles toward the floor at its forward edge 26. With this orientation, when the seat 10 is in the sleeping position I, the occupant's head will be elevated slightly with respect to the occupant's feet.

As should be apparent from FIG. 9, the seat pan 12, the lumbar cushion 14, the backrest 16, and the headrest 18 are oriented to form the linear sleep surface 42 when the seat 10 is in the sleeping position I. In this orientation, the seat pan pivot location P2 is in the same location as previously described with respect to the TTL position F, the limited recline position G, and the nap position H. It is noted, however, that the seat pan pivot location P2 does not need to be the same by comparison with the prior-described positions F, G, H, because the seat 10 has been oriented to form a bed for the occupant.

In connection with the seat 10, it is contemplated that the seat will include a leg rest 44, which is shown in dotted line format in FIG. 9. The leg rest may swing outwardly from a position at the front of the seat 10, along the line 46, as indicated. In addition, the leg rest 44 may incorporate a footrest, which is not illustrated.

In further connection with the seat 10, it is contemplated that at least the seat pan 12, the lumbar cushion 14, and the backrest 16 will be employed to accommodate the passenger and provide comfortable support. In other words, it is contemplated that the headrest 18 and the leg rest 44 are not needed to practice the present invention.

Additionally, any one of the seat pan 12, the lumbar cushion 14, the backrest 16, the headrest 18, and the leg rest 44 may include multiple segments. In the embodiments illustrated, each of the seat pan 12, the lumbar cushion 14, the backrest 16, the head rest 18, and the leg rest 44 are shown as unitary elements (or singular segments) of the seat 10. It is contemplated that one or more of these elements may comprise multiple segments that are articulatable with respect to one another.

With further reference to the seat 10 illustrated in FIG. 5-9, as should be apparent, each of the seat pan 12, the lumbar cushion 14, the backrest 16, the head rest 18, and the leg rest 44 are articulatable with respect to one another. While four positions are illustrated, the TTL position F, the limited recline position G, the nap position H, and the sleep position I, the seat 10 of the present invention may take another other intermediate position that may be selected by the occupant. Accordingly, these four positions F, G, H, I are exemplary of the different configurations of the seat 10. These four positions F, G, H, I are not intended to limit the present invention.

In one further additional embodiment of the present invention, it is contemplated that the lumber cushion 14 will be eliminated altogether. As a result, the backrest 16 is contemplated to extend to a location adjacent to the rear edge of the seat pan 12, thereby extending into the space occupied by the lumbar cushion 14 in the illustrated embodiment. In this embodiment, without the lumbar cushion 14, it is contemplated that the backrest 16 may be disposed at an angle $\delta$ and the seat pan 12 may be disposed at an angle $\alpha$ that differ from the angles described above.

In particular, in the embodiment excluding the lumbar cushion 14, when in the seat 10 is in the TTL position F, the angle $\alpha$ is contemplated to be about 5° and the angle $\delta$ is contemplated to be about 20°, more specifically 19.81°. In a more broad context for the TTL position F, the angle $\alpha$ is contemplated to fall within a range of 4-6° and the angle $\delta$ is contemplated to fall within a range of about 18-22°. In still another embodiment, the angle $\alpha$ is contemplated to fall within a range of 3-7° and the angle $\delta$ is contemplated to fall within a range of about 16-24°. In just another contemplated embodiment, the angle $\alpha$ may fall within a range of 2-8° and the angle $\delta$ may fall within a range of about 14-26°.

In the embodiment excluding the lumbar cushion 14, when in the seat 10 is in the napping position H, the angle $\alpha$ is contemplated to be about 15° and the angle $\delta$ is contemplated to be about 43°, specifically 43.14°. In a more broad context for the napping position H, the angle $\alpha$ is contemplated to fall within a range of 13-17° and the angle $\delta$ is contemplated to fall within a range of about 41-45°. In still another embodiment, the angle $\alpha$ is contemplated to fall within a range of 11-19° and the angle $\delta$ is contemplated to fall within a range of about 39-47°. In one further contemplated embodiment, the angle $\alpha$ may fall within a range of 9-21° and the angle $\delta$ may fall within a range of about 37-49°.

Figure 10:
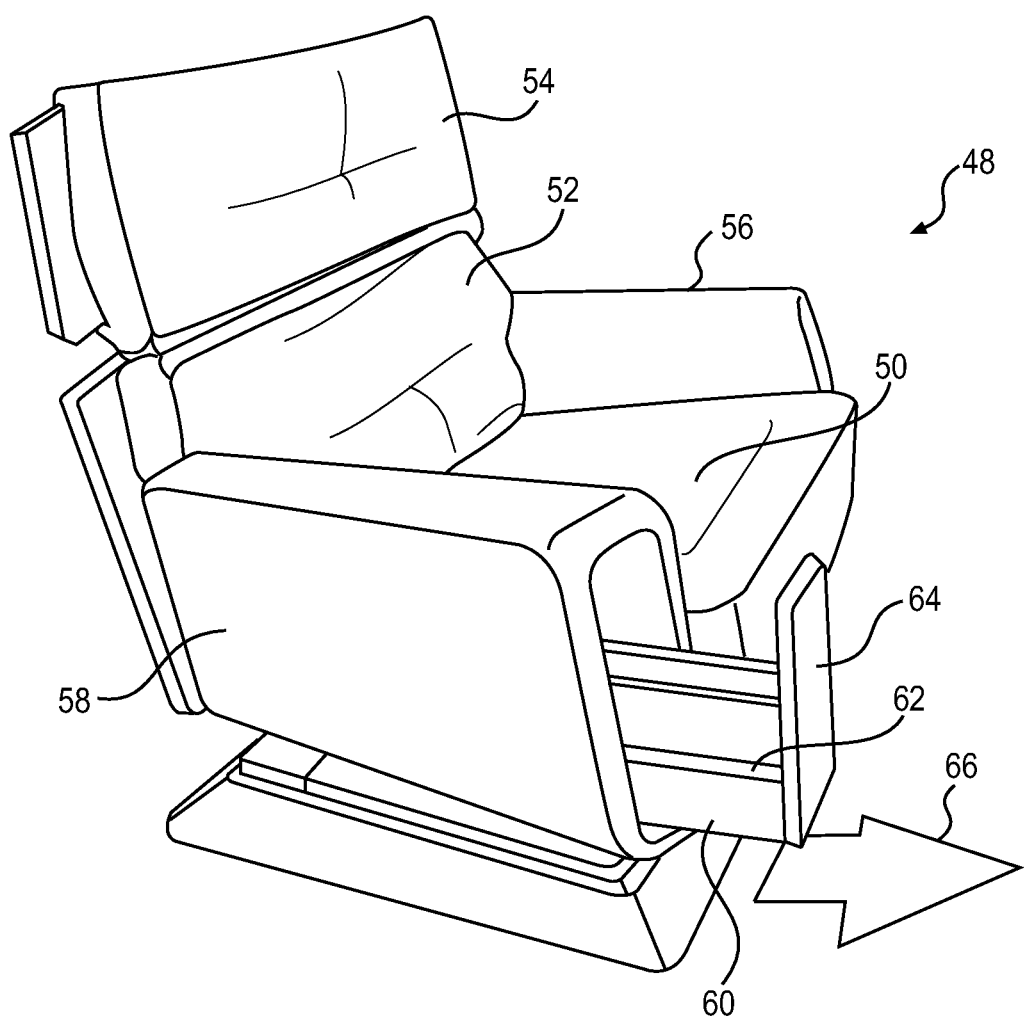
FIG. 10 is a perspective, front view of a seat according to the present invention having a storage tray incorporated into an armrest thereof.

FIG. 10 provides a perspective illustration of one contemplated embodiment of a seat 48 according to the present invention. The seat 48 includes a seat pan 50, a lumbar cushion 52, and a backrest 54. For simplicity, the headrest is omitted from the seat 48 illustrated in FIG. 10. As should be apparent, a headrest may be included, consistent with the discussion provided above with respect to FIGS. 5-9. The seat 48 includes two armrests 56, 58.

FIG. 10 also illustrates a storage tray 60 that is included in the armrest 58. The storage tray 60 includes a bin portion 62 and an end 64. The storage tray 60 slides into and out from the arm rest 58 in the direction of the arrow 66.

In the embodiment shown in FIG. 10, it is contemplated that the storage tray 60 will be provided in only one of the two armrests 56, 58. However, the storage tray 60 may be provided in both armrests 56, 58 without departing from the scope of the present invention.

The storage tray 60 is intended to be provided for passenger convenience. The storage tray may accommodate personal belongings of the passenger. As such, the passenger may readily access those personal items during flight.

Figure 11:
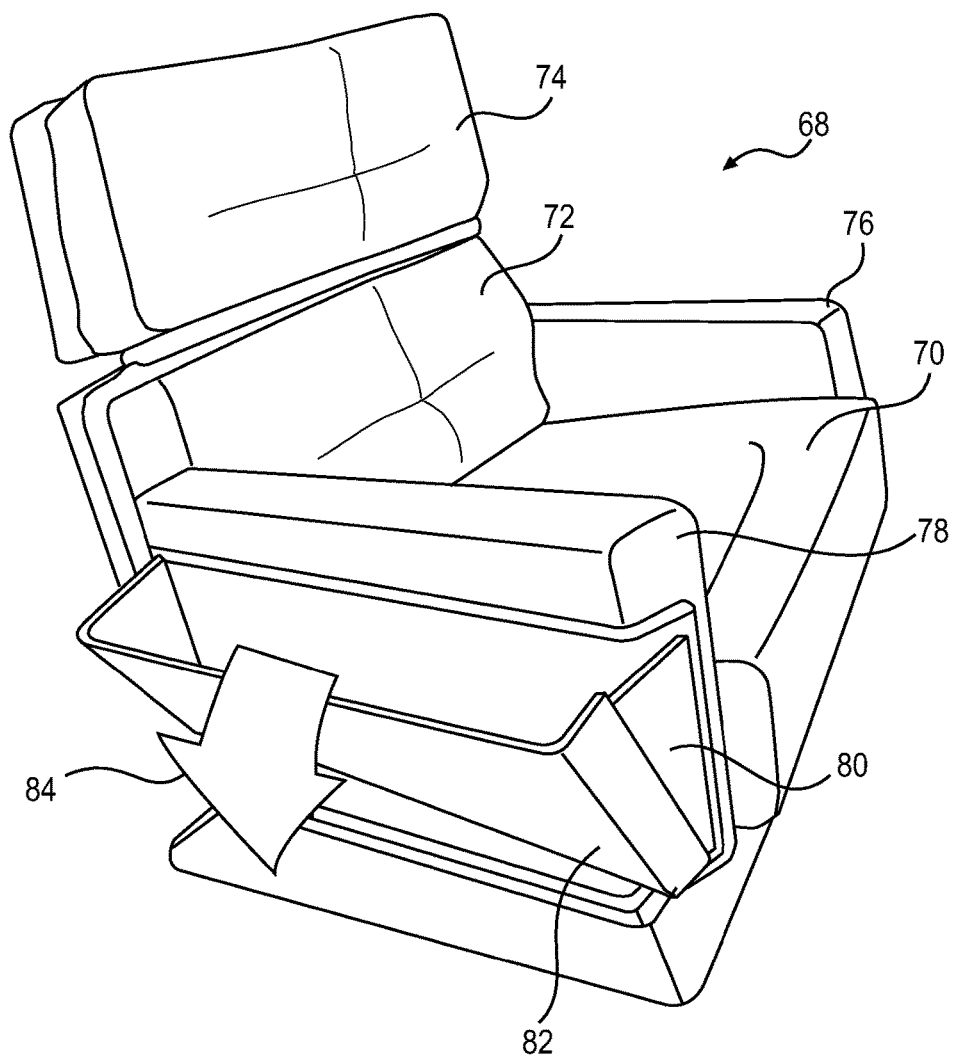
FIG. 11 is a perspective, front view of another seat according to the present invention having a storage bin incorporated into an armrest thereof.

FIG. 11 is a perspective illustration of a third embodiment of a seat 68 according to the present invention. The seat 68 is similar to the seat 48 in that the seat 68 includes a seat pan 70, a lumbar cushion 72, a backrest 74, and two armrests 76, 78. In this embodiment, a storage bin 80 is provided in the armrest 78. Here, the storage bin 80 includes a cover 82 that pivots outwardly from the seat 68 in the direction of the arrow 84. When the cover 82 is opened, the passenger may access any items contained therein.

With respect to this embodiment, it is contemplated that the storage bin 80 may be provided in either armrest 76, 78. However, as should be immediately apparent, it is more likely that the storage bin 80 will be provided only in the armrest 78 that is adjacent to an aisle in the aircraft. If provided in the armrest 76 that is adjacent to another seat 69 or next to a bulkhead, it may not be possible to open the cover 82.

In another contemplated embodiment of the present invention, it is contemplated that the seat 48, 68 may include a storage tray 60 in one armrest and a storage bin 80 in the other.

Figure 12:
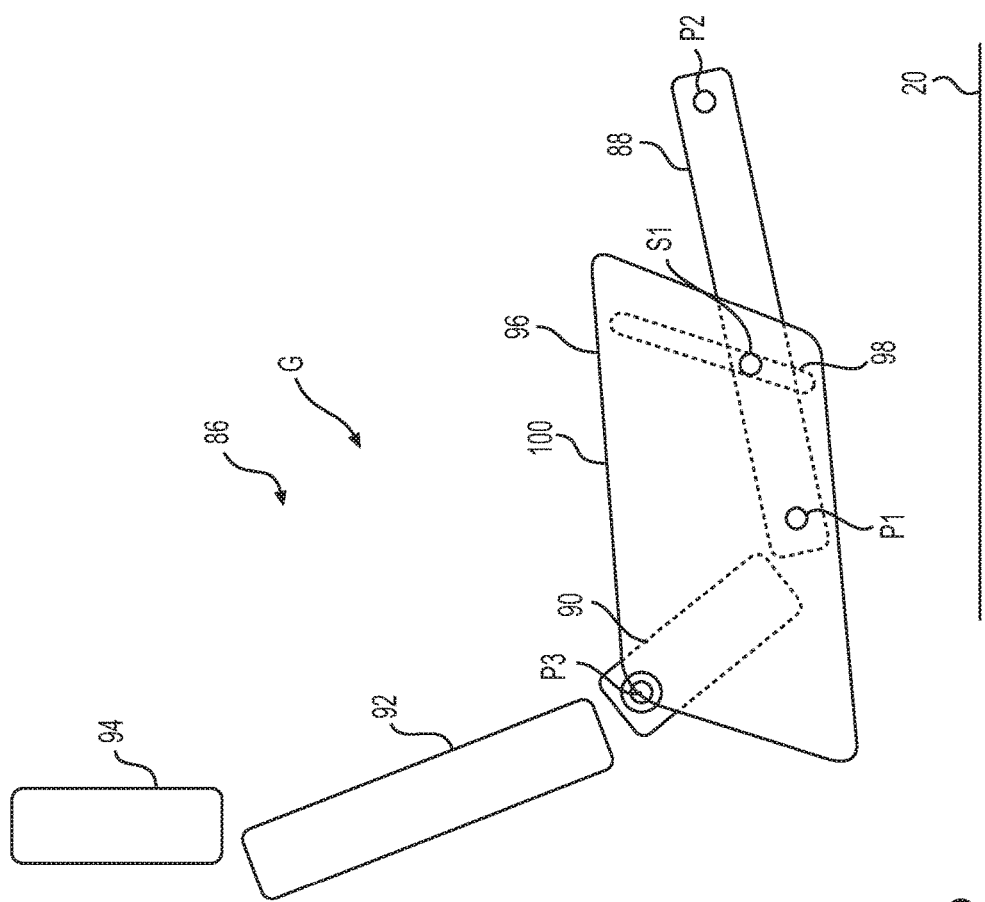
FIG. 12 is a graphical, side view of another embodiment of the seat of the present invention, where the seat is shown in the limited recline position.

FIG. 12 is a side view, graphical representation of a fourth embodiment of a seat 86 according to the present invention. This embodiment is intended to operate in the same manner as the seat 10 discussed in connection with FIGS. 5-9. As such, the seat 86 is contemplated to provide a TTL position F, a limited recline position G, a nap position H, and a sleep position I. FIG. 12 illustrates the seat 86 in a limited recline position G.

For reference, the seat 86 includes a seat pan 88, a lumbar cushion 90, a backrest 92, and a headrest 94. In addition, the seat 86 includes armrests 96. The backrest pivot location P1 and the seat pan pivot location P2 are provided in this view.

In this embodiment of the seat 86 the seat and the armrests 96 are contemplated to move in coordination with one another to provide the passenger with a high level of comfort. So that the various elements of the seat 86 may cooperate with the armrests 96, the armrests 96 are provided with a slot 98. A sliding pivot 51 is disposed with the slot 98. As the seat pan 12 moves between the TTL position F and the sleep position I, the sliding pivot S1 moves within the slot 98. In addition, this embodiment of a seat 86 includes a third pivot P3. The third pivot P3 is positioned at the top end of the lumbar cushion 90 and fixes the top end of the lumbar cushion to the armrests 96.

With respect to the seat 86, one aspect of this embodiment lies in the changing relationship between the seat pan 88 and the top 100 of the armrests 96. Specifically, as the seat 86 transitions from the TTL position F to the sleep position I, the depth of the seat pan 88 with respect to the tops 100 of the armrests (also referred to as the armrest height, h) decreases. One reason for this is that the passenger's position with respect to the tops 100 of the armrests 96 changes as the orientation of the seat 86 changes. To this end, as the passenger reclines from the TTL position F, it becomes increasingly more comfortable for the seat pan 88 to establish a shallower armrest height h.

Figure 13:
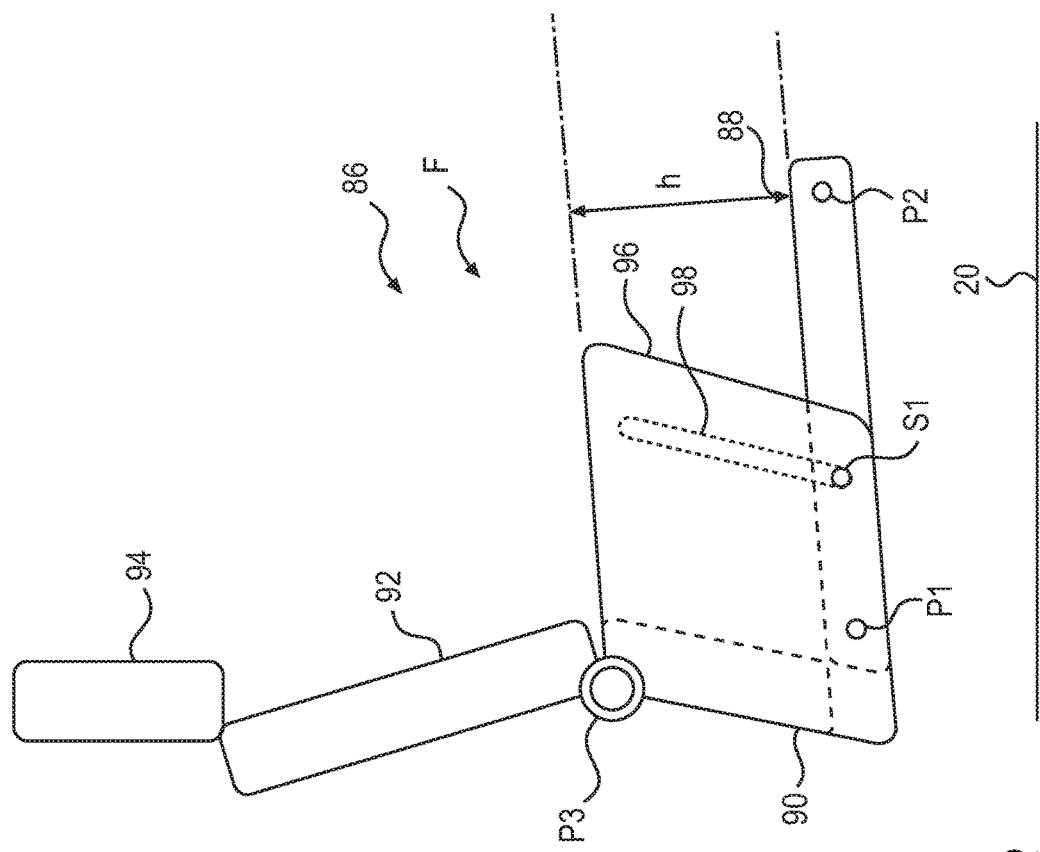
FIG. 13 is a graphical, side view of the seat shown in FIG. 12, with the seat being shown in the taxi, take-off, and landing position.

FIG. 13 illustrates the seat 86 according to this fourth embodiment, where the seat 86 is the TTL position F. As indicated the sliding pivot S1 is located at a bottom point of the slot 98.

Figure 14:
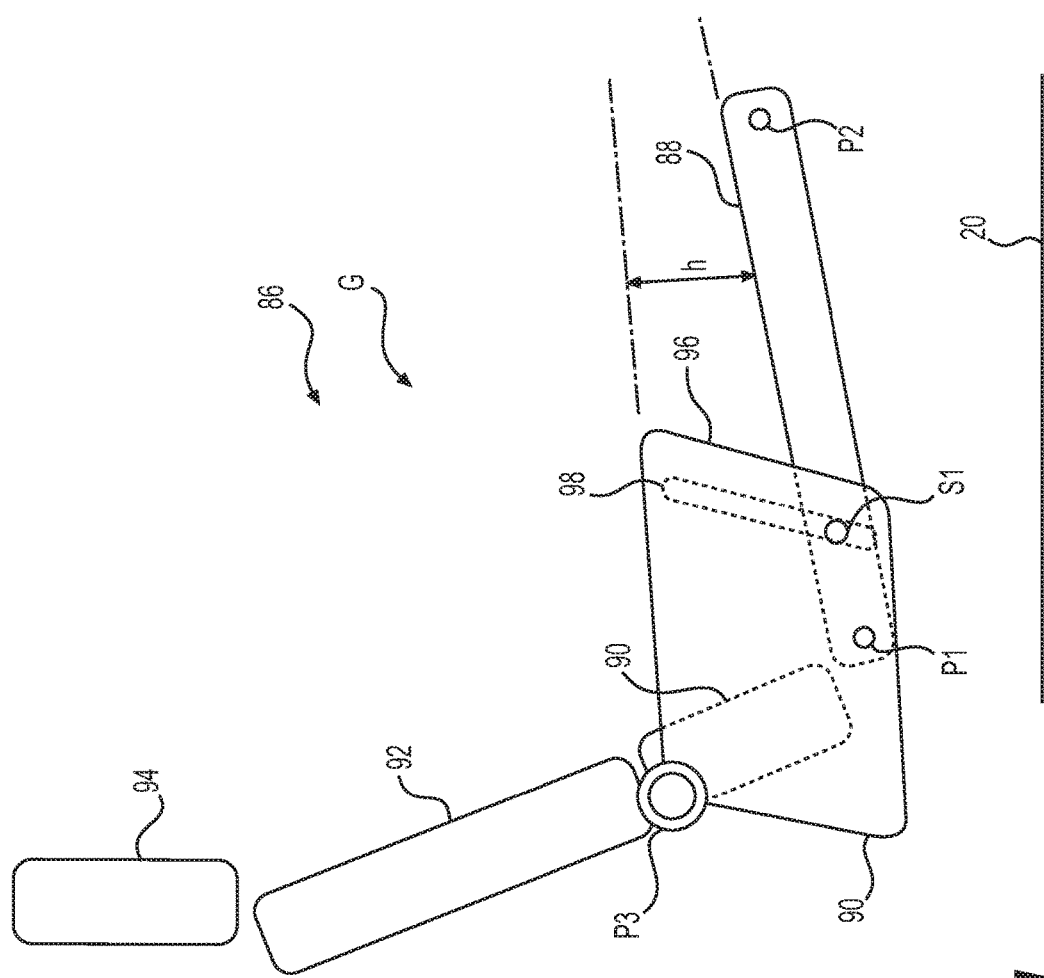
FIG. 14 is a graphical, side view of the seat shown in FIG. 12, with the seat being shown in the limited recline position.

FIG. 14 is a side view, graphical illustration of the seat 86 when in the limited recline position G. As is apparent, the sliding pivot S1 is at an elevated position with respect to the position illustrated in FIG. 13.

Figure 15:
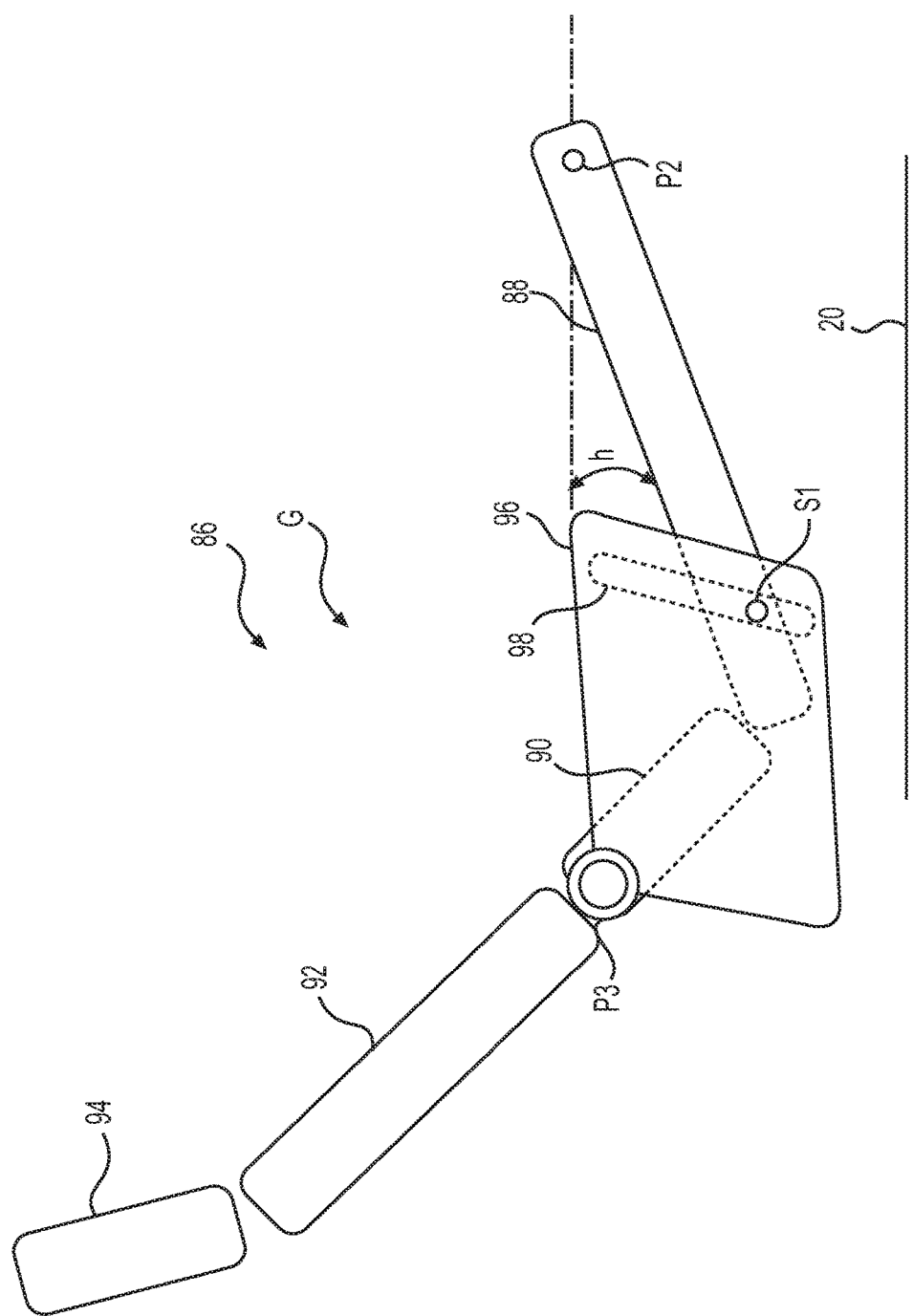
FIG. 15 is a graphical, side view of the seat shown in FIG. 12, with the seat being shown in the napping position.

FIG. 15 is a side view, graphical illustration of the seat 86 in the napping position G. This view is similar to the view provided in FIG. 12.

Figure 16:
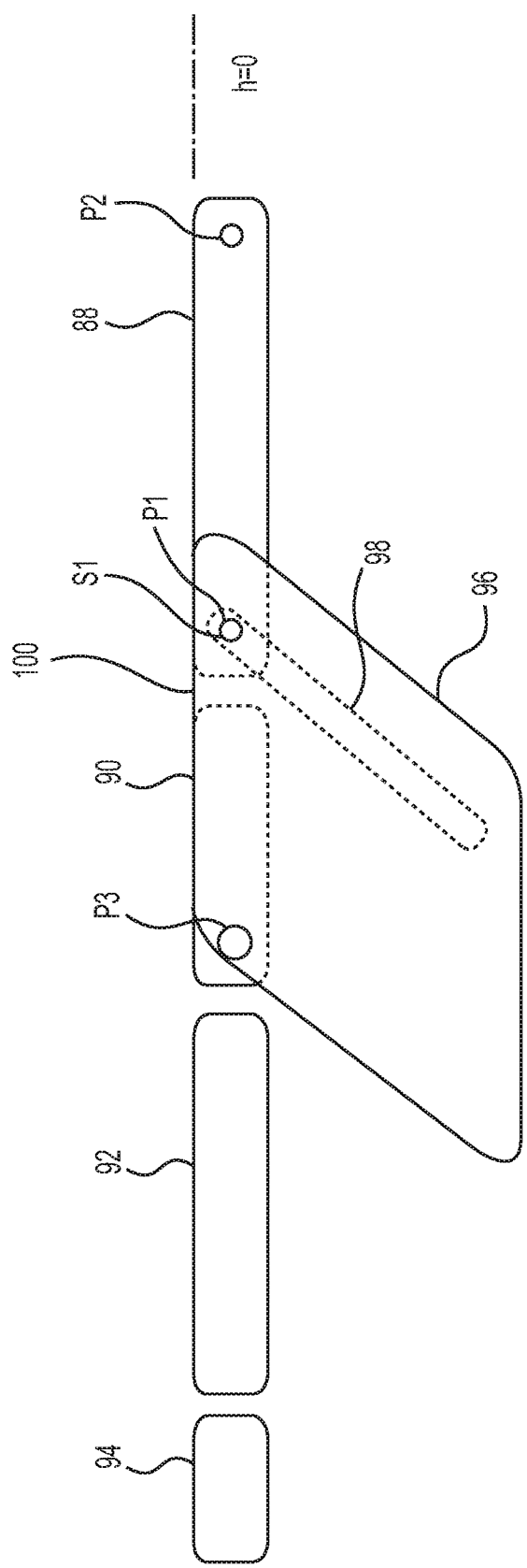
FIG. 16 is a graphical, side view of the seat shown in FIG. 12, with the set being shown in the sleeping position.

With respect to the sleep position I, it is contemplated that the seat pan 88 will be flush with the tops 100 of the armrests 96 as illustrated in FIG. 16. As such, the passenger occupying the seat 86 in the sleep position I has no impediment to ingress and egress from the seat 86 in the sleep position I. Moreover, with the tops 100 of the armrests 96 flush with the seat pan 88, the occupant enjoys a wider sleeping surface, which includes the tops 100 of the armrests 96. In other words, the tops 100 of the armrests 96 increase the width of the sleeping surface when the tops 100 of the armrests 96 are flush with the seat pan 88.

In an alternative embodiment of the seat 86, the seat pan 88 will not be flush with the tops 100 of the armrests 96. Instead, the armrests 96 will be slightly higher than the tops 100 of the armrests 96. In this embodiment, the armrests 96 continue to provide at least a minimal amount of lateral containment for a passenger within the seat 86.

In still a further embodiment, the seat 86 may be positionable between a height where the seat pan 88 is flush with the tops 100 of the armrests 96. The seat pan 88 also may be positionable such that it is slightly lower than the tops 100 of the armrests 96. Still other variations may be appreciated by those skilled in the art.

With respect to the seat 86, it is noted that the slidable pivot 51 also may be slidable within the seat pan 99 so that the seat pan 88 may move in relation to the slot 98 in the armrests 96 in an unimpeded fashion.

As should be apparent from FIGS. 13-16, the armrest height h may be measured from any position along the length of the seat pan 88 and the armrests 96. Since the seat pan 88 forms an angle with respect to the tops of the armrests 96, the distance will vary from one position to the next. It should be understood that, regardless of the location where the armrest height h is measured, the armrest height h will decrease from the TTL position F to the limited recline position G. Similarly, the armrest height h will decrease from the limited reline position G to the napping position H. In addition, the armrest height h will decrease further from the napping position H to the sleeping position I. As should be apparent from FIG. 16, the armrest height h is 0 inches (0 cm) in the sleeping position I, at least in this illustrated embodiment.

For purposes of the present invention, it is contemplated that the storage tray 60 and/or the storage bin 80 will be combined with the features illustrated in FIGS. 12-16.

It is noted that FIGS. 12-16 are intended to illustrate the general concept of a seat pan 88 that is movable with respect to the tops 100 of the armrests 96. These illustrations are not intended to be exact with regard to proportions or dimensions, but are merely graphical representations of the concept underlying the present invention.

With continued reference to FIGS. 12-16, in this embodiment, the pivot P3 remains in the same position with respect to the armrests 96, regardless of the selected position F, G, H, I of the seat 86. In this embodiment, the seat pan pivot location P2 remains in a fixed relation to the floor 20. As such, as the seat 96 transitions from one position F, G, H, I to another, the effect is that the armrests 96 move toward the floor 20, thereby lowering in overall height with respect to the floor 20.

Figure 17:
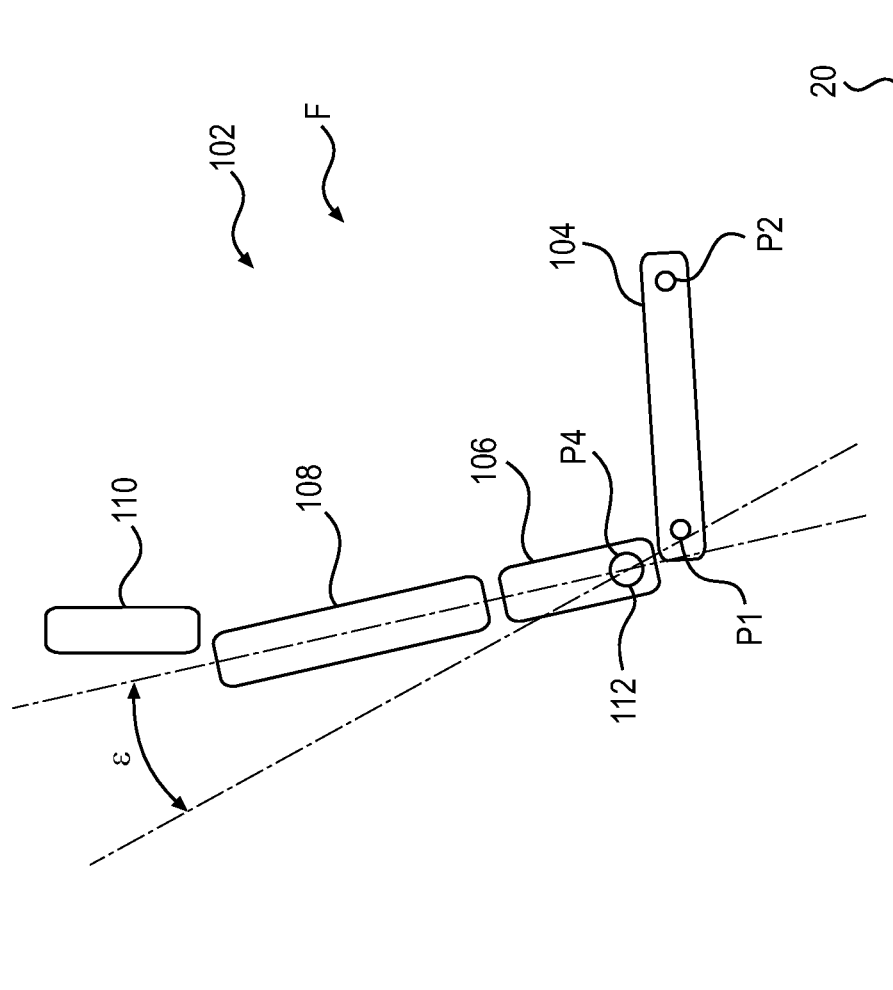
FIG. 17 is a graphical, side view of still another embodiment of a seat according to the present invention.

FIG. 17 is a side view illustration of a further aspect of the present invention, which is described in connection with a fifth embodiment. FIG. 17 is a side view graphical illustration of a seat 102 with a seat pan 104, a lumbar cushion 106, a backrest 108, and a headrest 110. The bottom end of the lumbar cushion 106 is provided with a weight-responsive mechanism 112 at the pivot location P4.

The weight-responsive mechanism 112 at pivot point P4 may be a spring-biased mechanism. Alternatively, the weight-responsive mechanism 112 may incorporate a pneumatic cylinder. There are virtually limitless designs for the weight-responsive mechanism 112 that is provided at pivot position P4. As a result, an exhaustive list of possible constructions is not provided herein.

It is contemplated that the weight-responsive mechanism 112 will permit the lumbar cushion 106, the backrest 108, and the headrest 110 to move in response to the weight of the passenger in the seat 102. Specifically, it is contemplated that the back of the seat (which encompasses the lumbar cushion 106, the backrest 108, and the headrest 110) will be permitted to move within a range of positions designated by the angle $\epsilon$.

Since it is difficult to design a seat 102 that accommodates every passenger weight and type, the weight-responsive mechanism 112 is included at least at the pivot point P4. The weight-responsive mechanism 112 adjusts the seat, within the limits of the angle $\epsilon$ to accommodate various human parameters, specifically the weight of the occupant of the seat 102.

With respect to the seat 102, it is contemplated that a more robust person (i.e., a heavier or larger person) will exert a greater force on the weight-responsive mechanism 112 than a person with a slighter build (i.e., a lighter or smaller person). The back of the seat 102 is designed to move rearwardly in response to the weight of the individual in the seat 102. As such, the weight-responsive mechanism 112 is designed to provide a greater level of comfort to the passenger in the seat 102. As should be apparent, when a heavy person sits on the seat 102, the weight-responsive mechanism 112 will exert a greater resistive force than when a light person sits on the seat 102. The magnitude of the resistive force applied by the weight-responsive mechanism 112 is proportional to the weight of the occupant in the seat 102.

In connection with the weight-responsive mechanism 112, it is contemplated that the mechanism 112 may be adjustable. As such, it is possible for the passenger to change the manner in which the seat 102 responds to his or her weight.

Because of the various regulations associated with the TTL position F of the seat, it is contemplated that the angle $\epsilon$ will be modest. In addition, it is contemplated that the weight-responsive mechanism 112 may be locked so as not to provide a weight-responsive reaction when the seat 102 is in the TTL position F.

The angle $\epsilon$ is contemplated to fall within a range of 0-15°. In another embodiment, the range for the angle $\epsilon$ is between about 5-15°, with a preferred angle of about 10°. In still other embodiments, the preferred angle is about 5°±2°. Still further embodiments are contemplated to fall within the scope of the present invention.

It is also contemplated that the weight-responsive mechanism 112 may be electromechanical in its design. If so, the weight responsive mechanism may sense the weight of the person and respond accordingly. Details of this contemplated embodiment are provided in connection with FIGS. 19-20, which are discussed below.

It is noted that there are a large number of possible devices and/or schemes that may be employed for the weight-responsive mechanism 112. The present invention is intended to encompass those variations.

In addition, while the weight-responsive mechanism 112 is contemplated to be positioned at pivot position P4 in the illustrated embodiment, it is contemplated that the weight-responsive mechanism 112 may have a distributed architecture. In other words, it is contemplated that the weight-responsive mechanism 112 may incorporate devices at each of the articulation joins between the seat pan 88, the lumbar cushion 90, the backrest 92, and the headrest 94. Still other configurations are contemplated to fall within the scope of the present invention.

With continued reference to the weight-responsive mechanism 112, it is contemplated that the mechanism 112 will be locked or disabled when the seat 102 is in the sleep position I. Specifically, it is contemplated that the back of the seat 102 should be fixed (or locked) into a horizontal condition when the seat is in the sleep position I. If not, there is the potential that the back of the seat 102 would move with respect to the horizontal reference line 22 when the seat is in the sleep position I. This has the potential for making the seat 102 uncomfortable to the passenger.

Figure 18:
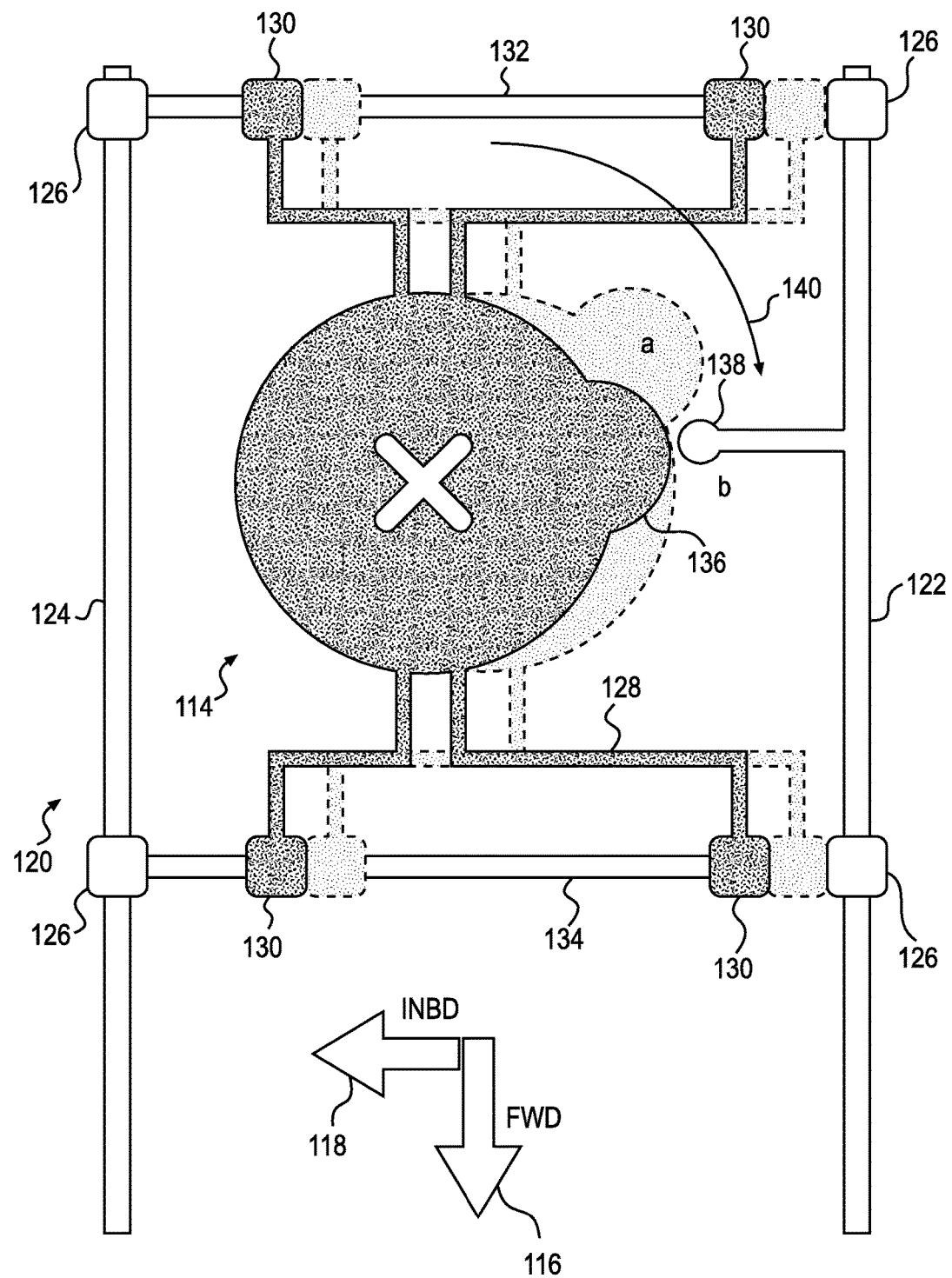
FIG. 18 is a graphical, top view of a swivel mechanism for a seat according to the present invention.

FIG. 18 illustrates yet another aspect of the present invention, a swivel mechanism 114. FIG. 18 is a graphical, top view of a swivel mechanism 114 according to the present invention.

As may be apparent to those skilled in the art, it is possible for the seat 10 on an aircraft to swivel from a forward-facing position 116 to an inboard-facing position 118. In other words, the seat 10 may be rotated through an angle of 90° to go from a position parallel to the longitudinal axis of the aircraft to a position that is perpendicular to the longitudinal axis of the aircraft.

It is contemplated that a passenger may desire to rotate the seat 10 through a 90° rotation when configuring the seat 10 into the sleep position I. As should be apparent to those skilled in the art, there may be insufficient room, in the forward-facing direction 116 to permit the passenger to transition the seat 10 to the sleep position I. As a result, it may be necessary for the seat 10 to be rotated, as described, before transitioning to the sleep position I.

In an alternative embodiment, the seat 10 may be rotated through 180° of rotation so that the seat 10 faces in an opposite direction to the initial orientation before transitioning to the sleep position I. In further alternative embodiments, the seat 10 may rotate through any suitable angle from 0-180° while remaining within the scope of the present invention.

When rotating a seat 10 from the forward-facing direction 116 to the inboard-facing direction 118 (or any other, alternative angular position), it is necessary to take into account physical obstacles, such as the fuselage (or sidewall) of the aircraft (and any bulkheads). So that no portion of the seat 10 impacts with the fuselage of the aircraft, it may also be necessary (depending on the positioning of the seat 10 on the aircraft) for the seat 10 to move laterally, in the inboard-facing direction 118, by a predetermined distance.

With reference to FIG. 18, the seat 10 is not illustrated. Instead, FIG. 18 provides a graphical representation of the support 120 underneath the seat 10. The support 120 includes longitudinal rails 122, 124. The longitudinal rails 122, 124 extend along the longitudinal axis of the aircraft. In other words, the longitudinal rails 122, 124 are parallel to the tracks (not shown) disposed in the floor 20 to which the seat 10 is attached.

The longitudinal rails 122, 124 permit the seat 10 to be moved forwardly and rearwardly, with respect to the longitudinal axis of the aircraft.

As should be apparent to those skilled in the art, furniture on an aircraft is secured to tracks that are embedded into the floor 20 of the cabin. Once installed on a track at a particular location, it is not possible for the furniture to be moved (at least not without proper tools). As noted above, reliance on tracks is not intended to be limiting of the present invention.

Despite the secure attachment of a seat 10 to the tracks in the floor 20 of an aircraft, it may be desirable for the seat 10 to be afforded limited movement in both the fore-aft direction and in the port-starboard direction. For example, some aircraft include tables adjacent to or in front of the seats 10. It may be desirable, therefore, for a passenger to move his or her seat 10 forward or to the side to position the seat 10 nearer to the table.

To permit movement of the seat 10, the seat 10 is connected to the swivel 114. The swivel 114 is connected, via trucks 126 to longitudinal rails 122, 124. Therefore, while the longitudinal rails 122, 124 are fixed in relation to the floor 20, the seat 10 may move along the rails 122, 124 via the trucks 126. Similarly, the swivel 114, which is disposed on a frame 128, connects to trucks 130 that ride on lateral rails 132, 134. In this manner, the seat 10 is permitted to move in port and starboard directions within the aircraft.

If a passenger wishes to rotate his or her seat 10 to be aligned with the inboard direction 118, the passenger need only rotate his or her seat by 90°. To avoid impacting with the fuselage, an adjacent bulkhead, or an adjacent seat, the swivel 114 is provided with a cam 136. Similarly, the longitudinal rail 122 is provided with a protrusion 138. When the seat 10 is rotated in the direction of the arrow 140, the cam 136 interacts with the protrusion 138 to push the seat 10 in the inboard direction 118, thereby avoiding the adjacent obstacle.

As should be apparent from FIG. 18, the cam 136 and protrusion 138 (or follower) are disposed on the side of the seat 10 where an obstruction is present. The cam 136 and follower 138 may be positioned at any location beneath the seat, in connection with the swivel 114, as required or as desired. Moreover, while a cam 136 and a protrusion 138 are illustrated, other configurations may be employed without departing from the scope of the present invention.

In an alternative embodiment of the seat 142 of the present invention, it is contemplated that multiple cams 136 and protrusions 138 may be employed, as required or as desired, without departing from the scope of the present invention.

Figure 19:
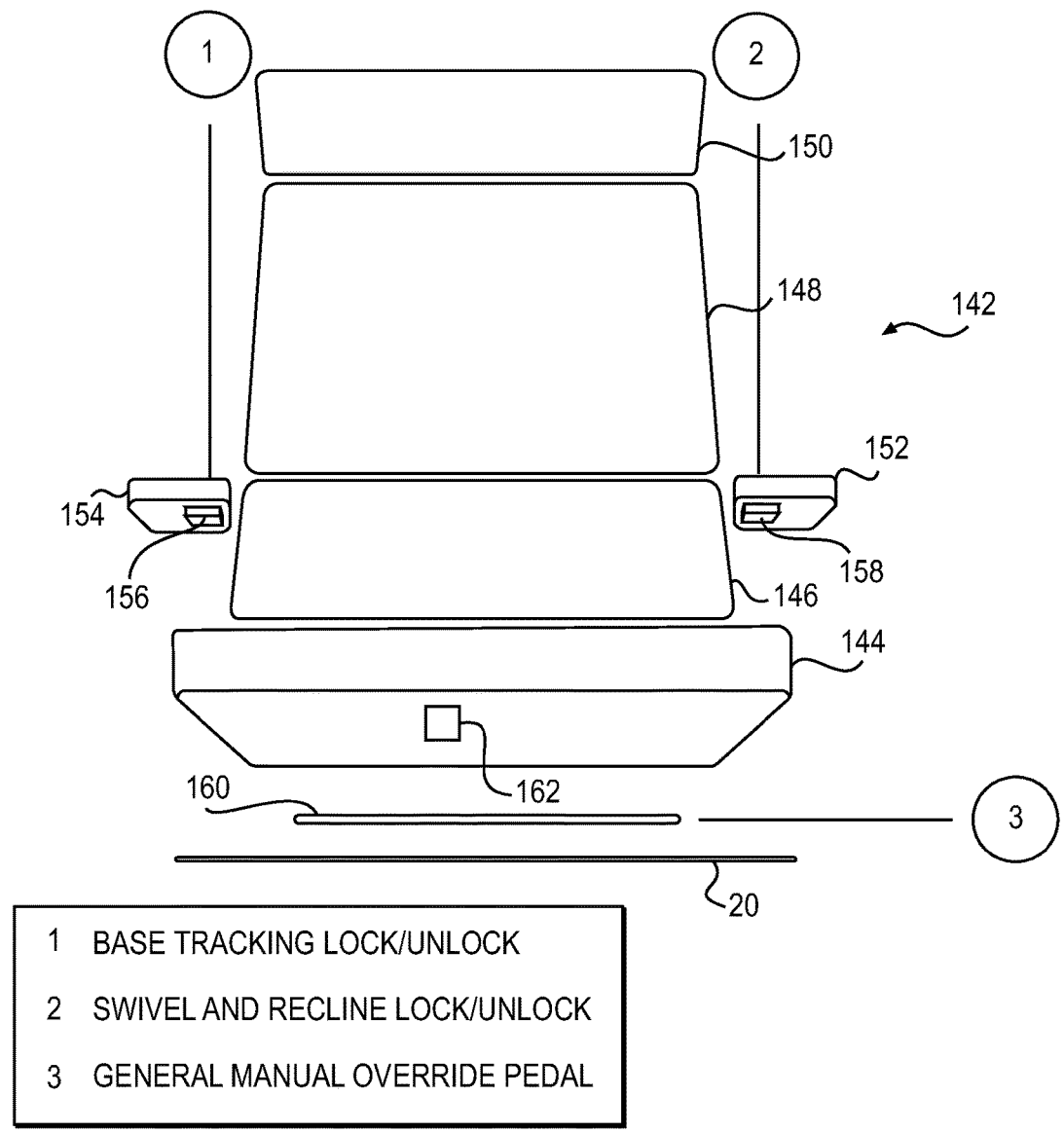
FIG. 19 is a graphical, front view of a further embodiment of a seat according to the present invention.

FIG. 19 is a graphical, front view of a seat 142 according to the present invention. The seat 142 includes a seat pan 144, a lumbar cushion 146, a backrest 148, a headrest 150, and two armrests 152, 154.

With respect to the headrest 150, one embodiment of the invention contemplates that the headrest 150 will be mounted on a support (not shown) such that the headrest 150 pivots at a point near to or at the top of the headrest 150. In this embodiment, the headrest 150 is understood to be mounted on a frame that extends upwardly from the backrest 148 (or some other structure). The headrest 150 is mounted to the support at the top of the headrest 150 or a position near to the top of the headrest 150. As such, the headrest 150 pivots outwardly from the support rather than pivoting forwardly, as is the case when the headrest 150 is mounted at a point on or near the top end of the backrest 148.

In FIG. 19, the locations of various controls are provided. Specifically, on the armrest 154, a control 156 for locking and unlocking the tracking of the base is provided. This control 156 permits the user to unlock the seat 142 so that it may be moved in the forward or rearward direction 116 or the inboard or outboard direction 118. Once the passenger has moved the seat 142 to the suitable position, the passenger may re-engage the control 156 to lock the seat 142 in the selected position.

With respect to the control 156, the switch employed may be mechanical, electrical, electromechanical, pneumatic, or any of a very large number of different types of switches. The precise construction of the control is not critical to the present invention. It is contemplated that the control 156 will be actuated to unlock the tracking of the base. In addition, it is contemplated that actuation of the control 156 also will lock the tracking of the base.

In the case of an electrical switch, for example, if the occupant of the seat 142 depresses the control 156 in a first instance, the tracking of the seat 142 will be released or unlocked to permit the seat 142 to move freely in the directions 116, 118. When the occupant of the seat 142 depresses the switch 156 in a subsequent instance, the tracking of the seat 142 is locked so that the seat 142 is maintained in the selected position.

The armrest 152 includes a control 158 that permits the passenger to lock or unlock the swivel and recline features of the seat 142. Specifically, upon unlocking the control 158, the passenger may manipulate the seat 142 to an appropriate swiveled and/or reclined orientation. Once placed into the desired configuration, the passenger may engage the lock, via the control 158, to fix the seat 142 in the selected position.

The control 158 is contemplated to function in the same manner as the control 156. As should be immediately apparent, this is not required to practice the present invention. The controls 156, 158 may operate in different manners without departing from the scope of the present invention.

With respect to the control 158, the switch employed may be mechanical, electrical, electromechanical, pneumatic, or any of a very large number of different types of switches. The precise construction of the control is not critical to the present invention. It is contemplated that the control 158 will be actuated to unlock the swivel and recline positions of the seat 142. In addition, it is contemplated that actuation of the control 158 also will lock the swivel and recline positions of the seat 142.

In the case of an electrical switch, for example, if the occupant of the seat 142 depresses the control 158 in a first instance, the swivellability/reclinability of the seat 142 will be released or unlocked to permit the seat 142 to move freely in from the TTL position F to any other selected swiveled/reclined position. When the occupant of the seat 142 depresses the switch 158 in a subsequent instance, the swiveled/reclined position of the seat 142 is locked so that the seat 142 is maintained in the selected position. As should be apparent, the same operation controls the swivel position of the seat 142, at least in one contemplated embodiment of the invention.

Underneath the seat 142 is a manual override pedal 160. The manual override pedal 160 is provided so that a steward or stewardess may override the locks on the seat 142 so that the seat 142 may be returned to its initial position (for taxi, take-off, and landing, for example).

As should be apparent to those skilled in the art, the locations of the controls 156, 158 on the armrests 152, 154 are merely exemplary of this one embodiment of the seat 142 of the present invention. Both controls 156, 158 may be located on the same armrest 152, 154. Similarly, the controls 156, 158 may be placed at any other location on the seat 142 without departing from the scope of the present invention.

It is noted that the seat 142 of the present invention is contemplated to be entirely mechanical in its operation. As such, the seat 142 is contemplated to be devoid of electrical or pneumatic controls of any kind. So constructed, it is contemplated that the seat 142 of the present invention will be light in weight and, therefore, not reduce the range of the aircraft. As should be apparent to those skilled in the art, the greater the weight of an aircraft, the more fuel that is required for the aircraft to reach its destination. As a result, the greater the weight of the seat 142, the smaller the range (or distance travelable) by the aircraft when the fuel tanks are filled to capacity. As should be apparent to those skilled in the art, the "range" of an aircraft is a measure of the distance that an aircraft is capable of flying on a full "tank of gas," taking into account factors such as the maximum takeoff weight limit for the aircraft. This is not to say that the aircraft fuel tanks are filled to 100% capacity. This definition takes into account the permissible takeoff weight of the aircraft, which may necessitate a fuel burden of less than 100% of the fuel tank capacity.

The present invention is not intended to be limited to a solely mechanical operation. To the contrary, seats 142 that incorporate electromechanical and/or pneumatic operations, among others, also are intended to fall within the scope of the present invention.

With respect to the various components of the seat 142 (which is inclusive of the various embodiments described herein), it is contemplated that the frame elements of the seat 142 will be made from aluminum or an aluminum alloy. Aluminum is very strong and lightweight. Alternative materials include, but are not limited to iron and its alloys, including steels, titanium and its alloys, magnesium and its alloys, beryllium and its alloys, carbon fiber composites, aramid fiber composites, nylon, plastics, polymers, and the like. The seat pan 144, the lumbar cushion 146, the backrest 148, and the headrest 150 are contemplated to be a combination of a foam core covered in a suitable material such as leather, cloth, vinyl, or the like.

Figure 20:
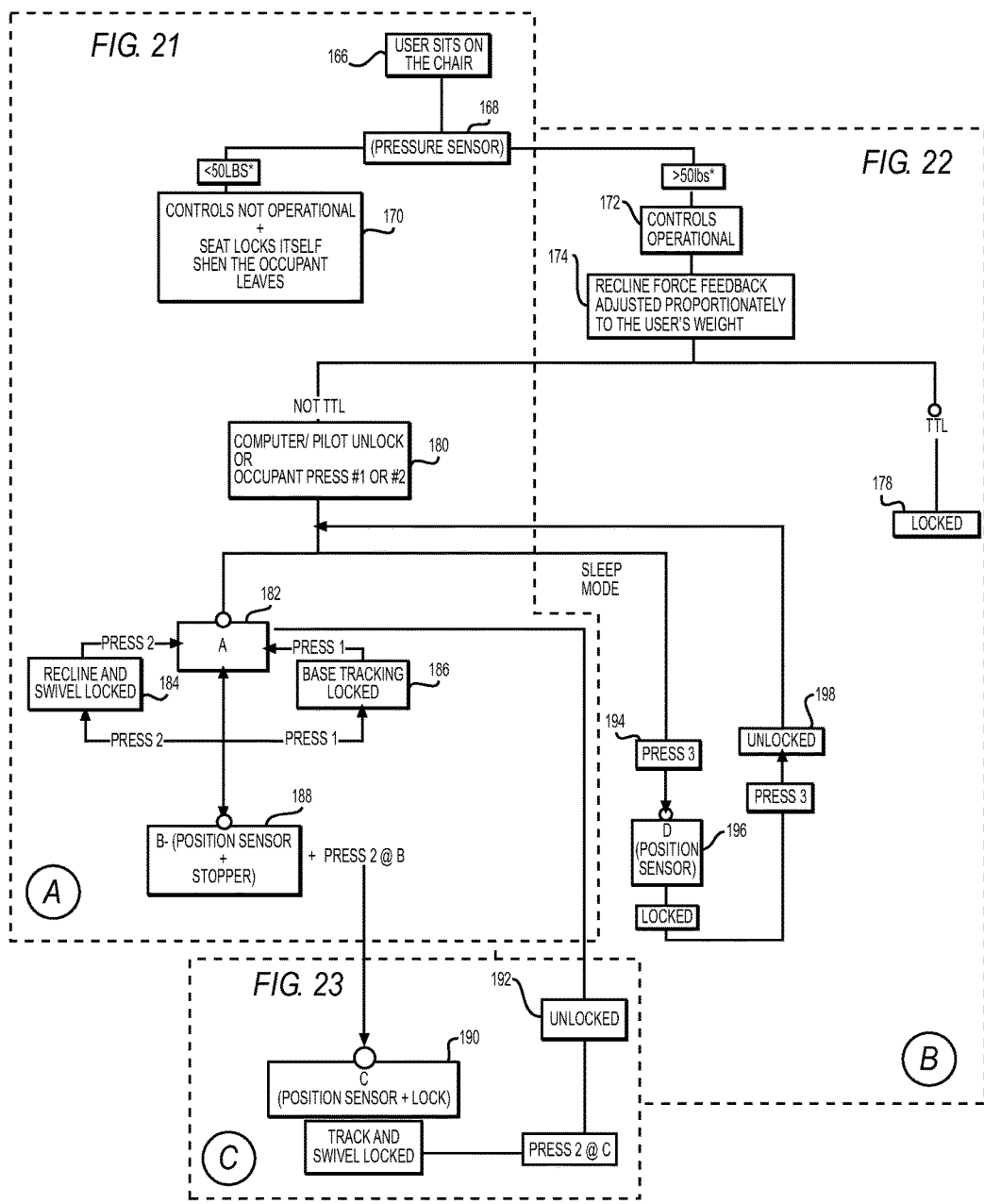
FIG. 20 is a flow chart illustrating one method of operation of the seat according to the present invention.
Figure 21:
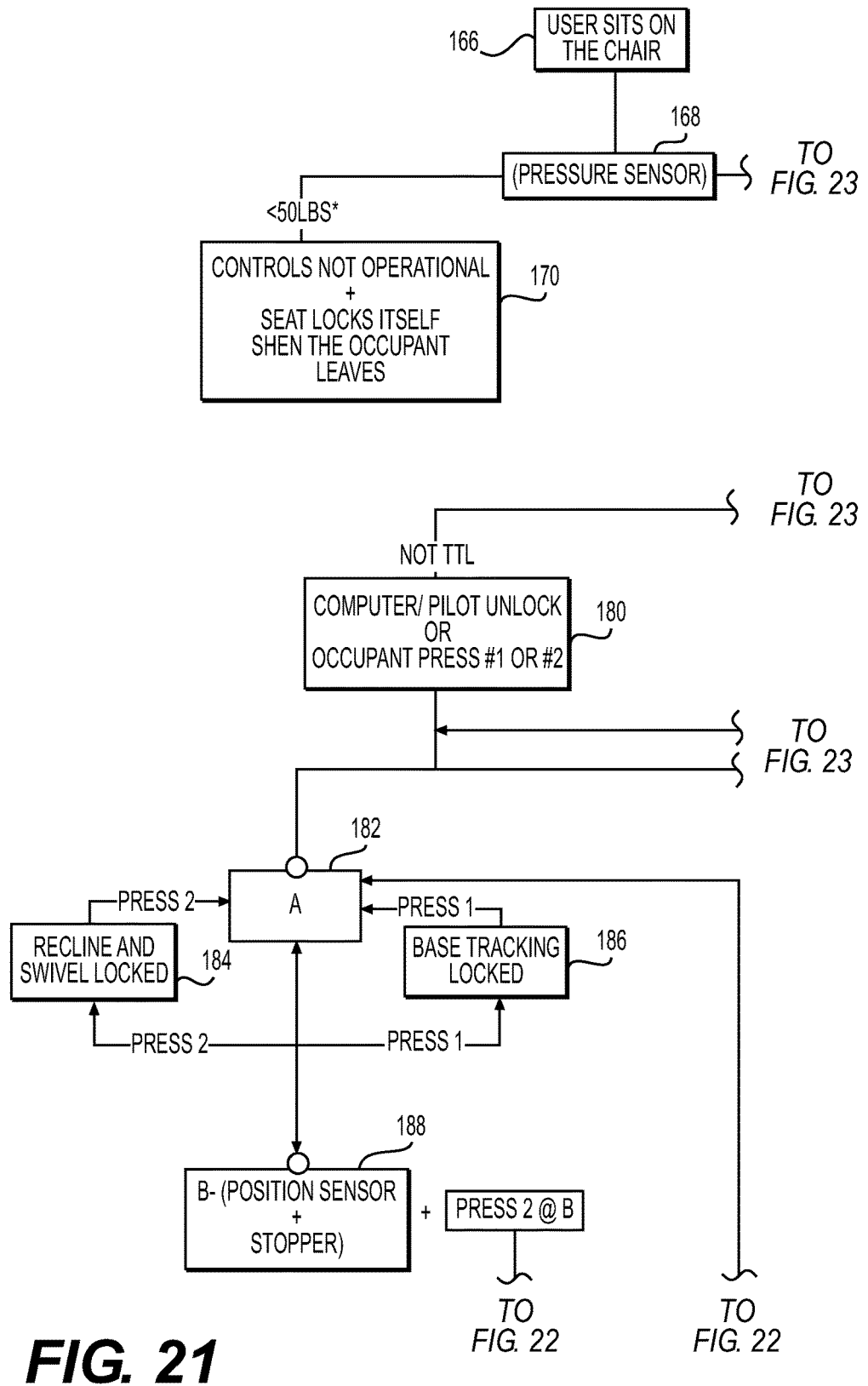
FIG. 21 is an enlarged segment of the flow chart in FIG. 20, which is encompassed by the area designated "A;"
Figure 22:
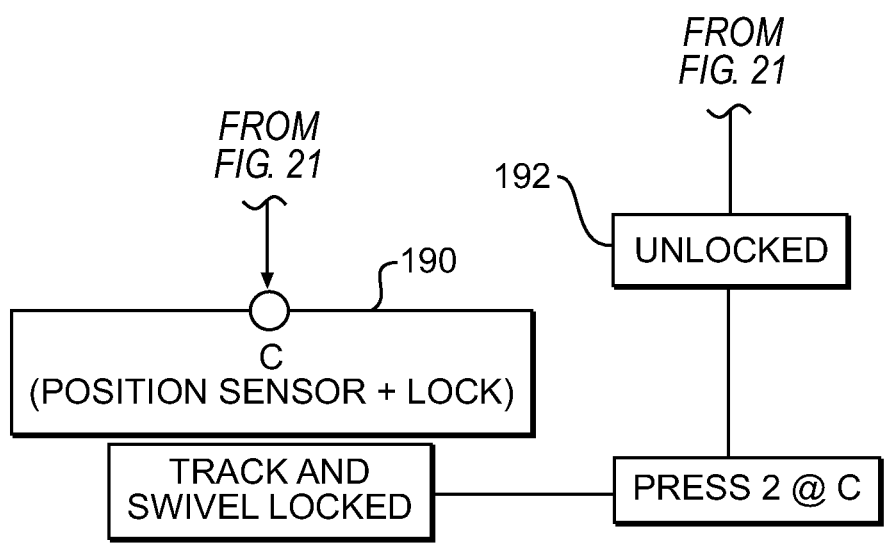
FIG. 22 is an enlarged segment of the flow chart in FIG. 20, which is encompassed by the area designated "B;"
Figure 23:
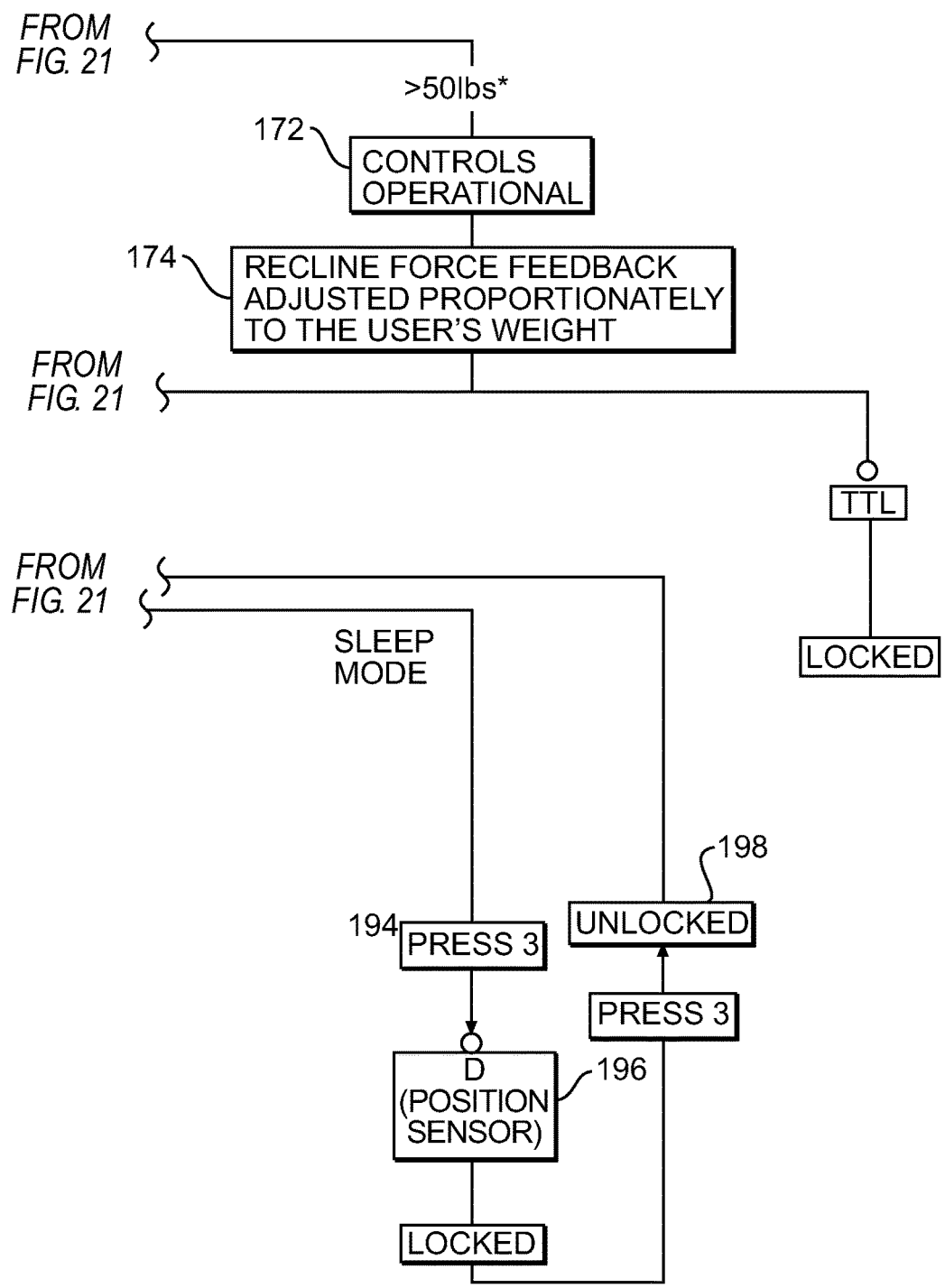
FIG. 23 is an enlarged segment of the flow chart in FIG. 20, which is encompassed by the area designated "C"

FIG. 20 is a schematic illustration of one contemplated method for the operation of the seat 142 that is illustrated in FIG. 19. For ease of discussion, the definitions of the TTL position F, the limited recline position G, the napping position H, and the sleep position I are applicable to this schematic illustration.

Before discussing the various steps that are illustrated in FIG. 20, the seat 142 is intended to include a device that can sense the presence of a person sitting therein. Any suitable weight sensor 162 may be incorporated into the seat pan 144, as should be apparent to those skilled in the art.

The operation of the seat 142 is summarized by the flow chart of FIG. 20. The method 164 begins at step 166, which is where the user sits in the seat 142. The method then proceeds to the step of sensing the weight of the passenger at step 168. Here, the pressure sensor (or weight sensor) detects the presence of an occupant in the seat 142.

At the pressure sensing step 168, a determination is made based on the weight detected in the seat. The predetermined weight threshold may be any suitable amount. In the illustrated example, the predetermined threshold weight (or mass) is 50 pounds (22.68 kg). In the pressure sensor detects a weight of less than 50 pounds (22.68 kg), the method proceeds to a deactivation step 170. At the deactivation step 170, the seat 142 is locked so that it cannot be moved from its initial position, regardless of what controls are manipulated. The deactivation of the seat 142 is not released until the person leaves the seat 142.

If the pressure sensing step 168 determines that the weight of the occupant exceeds 50 pounds (22.68 kg), the method proceeds to an activation step 172, where all of the controls for the seat 142 are made available to the occupant.

After the activation step 172, the method proceeds to a weight feedback adjustment step 174. The weight feedback adjustment step 174 provides a force feedback that is applied to the seat 142 depending upon the weight of the occupant. This may include, but is not limited to, adjustment of the weight-responsive mechanism 112.

It is contemplated that the seat 142 will incorporate one or more weight-responsive elements that may be control mechanically, electrically, or otherwise to adjust the responsive characteristics of the seat 142 when occupied. At the weight feedback adjustment step 174, a central processor unit ("CPU") or similar device (i.e., a mechanical compensator) provides a weight feedback so that the occupant is made as comfortable as possible while seated in the seat 142.

It is noted that, if the seat 142 is provided with an automatic weight-responsive mechanism 112 (or similar compensator), the step 174 may be omitted from the operational scheme 164 of the present invention.

After the weight feedback adjustment step 174, the method 164 proceeds to the TTL determination step 176. At this step, the method determines if the aircraft is in a TTL mode of operation. This may be indicated by an electrical signal that is inputted into the CPU by a pilot, co-pilot, or flight crew member, for example. Alternatively, the TTL flight condition may be manually inputted into the seat 142 via a master activation switch that is activated by a crew member, for example. This includes, for example, release of a manual lock.

Regardless of the manner in which the TTL condition is inputted in to the seat 142, if it is determined that the aircraft is in a TTL mode of operation, the method proceeds to a second deactivation step 178. At the deactivation step 178, the controls 156, 158 on the seat 142 are deactivated so that the occupant cannot reconfigure the seat 142 from the TTL position F.

If the aircraft is not in a TTL mode of operation, the method proceeds to an activation step 180. The activation step 180 may be initiated by computer control, an unlock command issued by the pilot or crew, or a command issued by the passenger by activation of one of the controls 156, 158. Still other signals may be employed to activate the seat 142 without departing from the scope of the present invention.

If the aircraft is not in a TTL mode of operation, the method 164 proceeds to accept commands at a TTL command input step 182. The TTL command input step 182 may receive commands from either one or both of controls 156, 158. At this step, the seat is in the TTL position F. If the occupant of the chair actuates the control 156, the base tracking is unlocked and the seat 142 is permitted to travel on the longitudinal rails 122, 124 and/or the lateral rails 132, 134. If the control 156 is released at the base tracking lock step 186, the locks for the base tracking engage and the seat 142 becomes fixed in the position selected. Similarly, if the control 158 is depressed, the swivel and recline features are unlocked. When the control 158 is released at the swivel and release lock step 184, the swivel and recline features become locked in their current condition. As may be appreciated, the controls 156, 158 may be actuated repeatedly. As should be apparent, the control 156 provides a locking and unlocking function with respect to the rails 122, 124, 132, 134. The control 158 provides a locking and unlocking function with respect to the swivel 114 and a recline mechanism that supports the various elements of the seat 142.

When the seat 142 reaches the limited recline position G, the method proceed to the limited recline command receive step 188. At the limited recline position G, a position sensor in the seat 142 and a stopper pause the seat 142 in the limited recline position G. If the occupant actuates the control 158, the seat 142 proceeds from the limited recline position G to the napping position H.

When the seat 142 reaches the napping position H, the seat 142 again stops at this preset position. This position is indicated by the napping position command receive step 190. At this point, the track and swivel control reaches a limit condition and becomes locked so that the occupant cannot proceed to the sleeping position I without additional interaction. This additional interaction is contemplated to involve assistance from a crew member.

After reaching the limit at the napping position I, control of the seat 142 may be reversed to the TTL position F, whereupon the above described method may be repeated. When in the napping mode H, if the control 158 is actuated, the seat 142 is unlocked at the release step 192 so that the seat 142 may return to the TTL position F.

If the occupant wishes the seat 142 to be configured for the sleep position I, the general manual override switch 160 is depressed at the manual override step 194. The seat 142 may then be manipulated into the horizontal or sleep position I, at which time the sensors measure that the seat 142 is in the sleep position I and lock the seat 142 in the sleep position I. This occurs at the sleep position locking step 196. The seat 142 may be released from the sleep position I by actuating the manual override switch 160 at the manual override step 198. Once released from a locked condition, the seat 142 may return to the TTL position F or any other intermediate position selected by the occupant.

As may be apparent from the discussion of the method illustrated in FIG. 20, the seat 142 is contemplated to move from one preset position F, G, H, I by actuating one or more of the control switches 156, 158, 160. With only three control switches at the occupant's command, the operation of the seat 142 is considerably simpler than prior art aircraft seats. In addition, the four preset positions F, G, H, I have been selected as the positions most likely to be selected by an occupant.

As discussed, the operation of the seat 142 may be mechanical, electrical, pneumatic, or any combination of these methodologies, among others. While the seat 142 is contemplated to be operated primarily mechanically, an electromechanical operation is well within the scope of the present invention.

Figure 24:
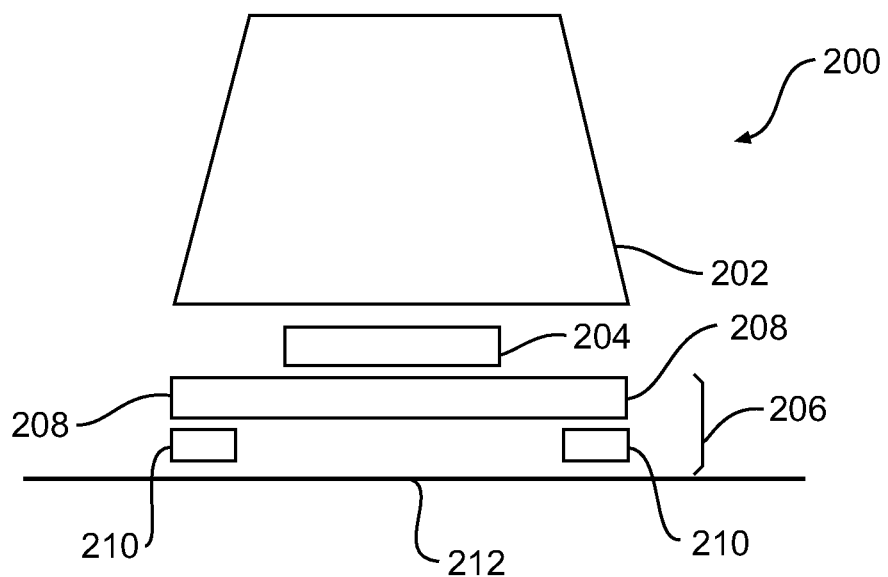
FIG. 24 is a graphical illustration of a further embodiment of the sea according to the present invention.

Reference is now made to FIG. 24, which is a graphical illustration of a further embodiment of a seat 200 according to the present invention. The seat 200 is illustrated in a simple, graphical manner to show that the seat portion 202, which accommodates a person, is disposed atop a swivel 204, which is disposed atop a tracking device 206. The tracking device 206 includes a lateral tracking segment 208 and a longitudinal tracking segment 210. The tracking device 206 is secured to the floor 212 of the aircraft in the manner discussed above.

The seat portion 202 is delineated by the trapezoidal region depicted in FIG. 24. The seat portion 202 is intended to encompass a seat pan, seat cushion, seat back, arm rests, and other portions of the seat 200 that support a person in a seated position.

The tracking device includes the lateral tracking segment 208 and the longitudinal tracking segment 210. The lateral tracking segment 208 permits the seat portion 202 to move in a direction that is parallel to a line traversing the aircraft in the lateral direction. In other words, the lateral tracking segment 208 permits an occupant of the seat 200 to move the seating portion 202 side to side. The longitudinal tracking segment 210 permits the seat portion 202 to be moved along a line parallel to the longitudinal axis of the aircraft. As should be apparent, the directions described above are in relation to the seat 200 when oriented in a forward-facing direction in the aircraft.

In the illustrated embodiment, the longitudinal tracking segment 210 is attached to the floor 212 of the aircraft, beneath the lateral tracking segment 208. As should be apparent to those skilled in the art, in an alternative embodiment, the lateral tracking segment 208 may be attached to the floor 212 and support the longitudinal tracking segment 210. Either construction is contemplated to fall within the scope of the present invention.

In a further construction contemplated by the present invention, the lateral tracking segment 208 and the longitudinal tracking segment 210 may be combined together on the same plane to form the tracking device 206. In this embodiment, the tracking segments 208, 210 are not stacked atop one another.

In this embodiment of the seat 200, the swivel 204 is positioned atop the tracking device 206, between the seat portion 202 and the tracking device 206. This orientation departs from seats where the swivel 204 is connected to the floor 212 and the tracking device 206 is mounted above the swivel 204. When the tracking device 206 is attached atop the swivel 204, the positioning of the seat portion 202 moves according to a less than intuitive motion, as should be apparent to those skilled in the art. The less than intuitive motion is especially pronounced when the seat portion 202 is tracked laterally or longitudinally before swiveling. Therefore, positioning the swivel 204 atop the tracking device 206 is considered to be a more attractive construction for the seat 200.

As should be apparent from the foregoing, the construction of the seat 200 provides a more natural and expected motion of the seating portion 202 because the swivel 204 is supported by the tracking device 206. Here, the swivel 204 is understood to define a swivel axis beneath the seat portion 202, extending vertically through the seat portion 202. In other words, the seat portion 202 lies on the swivel axis. No matter the location of the seat portion 202 with respect to the tracking device 206, the positioning of the swivel 204 permits the seat portion 202 to rotate about the seat axis. As such, regardless of the position of the seat portion 202 with respect to the tracking device 206, the seat portion 202 always spins on its axis, which is the same as the swivel axis.

As should be apparent, in the alternative embodiment where the swivel 204 is connected to the floor 212 of the aircraft and the tracking device 206 is mounted above the swivel 204, the rotational axis of the swivel 204 remains stationary. With this construction, the swivel axis does not move together with the seat portion 202. As a result, when the seat portion 202 is moved laterally or longitudinally, as permitted by the tracking device 206, the seat portion 202 no longer lies on the swivel axis. When the seat portion 202 is moved away from the swivel axis, the seat portion 202 is at a dislocated position with respect to the swivel axis. In this dislocated position, is the seat portion 202 is rotated about the swivel axis, the seat portion 202 travels in an arc with respect to the swivel axis. This type of motion is less intuitive and natural for an occupant of the seat 200.

Figure 25:
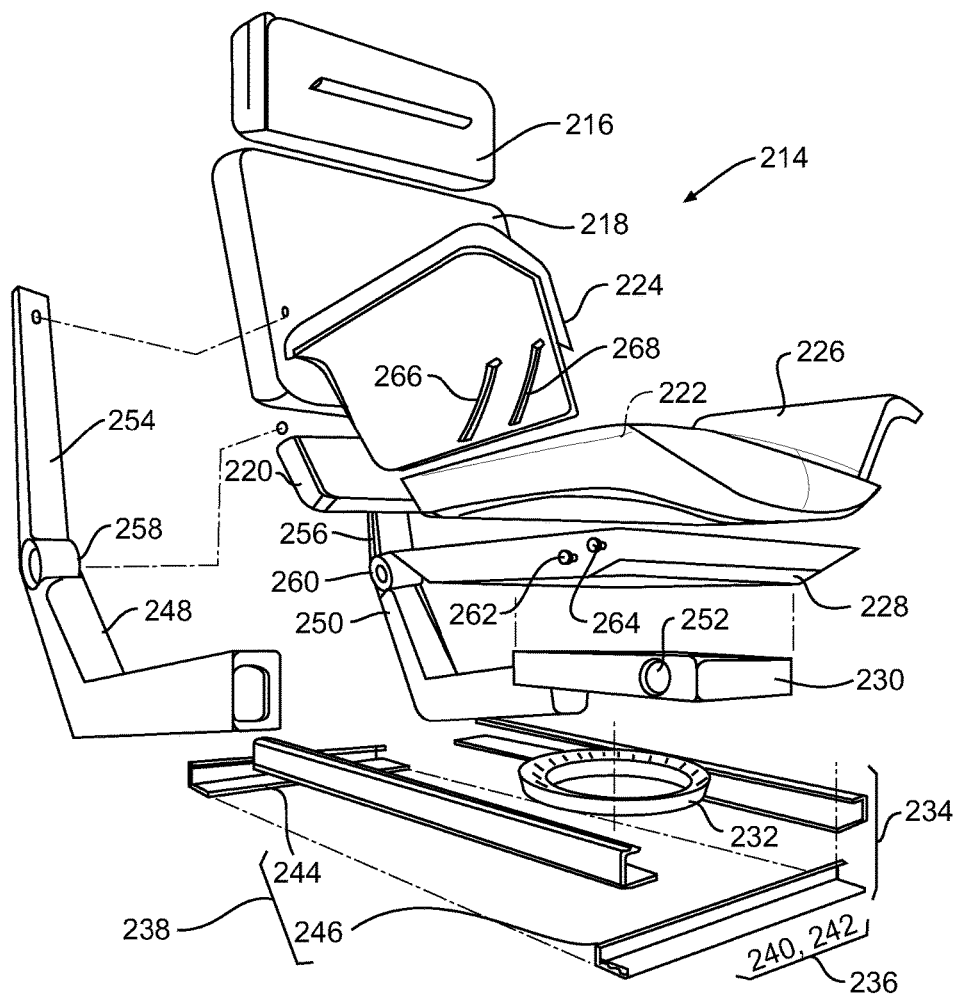
FIG. 25 is an exploded view of a detailed rendering of the seat shown graphically in FIG. 24.

FIG. 25 is an exploded view of a seat 214 consistent with the embodiment illustrated in FIG. 24. The seat 214 includes a headrest 216, a backrest 218, a lumbar cushion 220, and a seat cushion 222. The seat 214 also includes two armrests 224, 226. The seat cushion 222 is mounted atop a seat pan 228 that is connected to a reclining mechanism box 230. The reclining mechanism box 230 is mounted atop a swivel 232. The swivel 232 is connected to a tracking device 234, which is connected to the floor of the aircraft.

As should be apparent from FIG. 25, the tracking device 234 includes a longitudinal tracking segment 236 and a lateral tracking segment 238. The longitudinal tracking segment 236 includes two longitudinal tracks 240, 242. Similarly, the lateral tracking segment 238 includes two lateral tracks 244, 246.

Unlike the embodiment illustrated in FIG. 24, in the embodiment illustrated in FIG. 25, the longitudinal tracking segment 236 is mounted atop the lateral tracking segment 238. As described above, the longitudinal tracking segment 236 allows the seat 214 to translate in the longitudinal direction of the aircraft. Similarly, the lateral tracking segment 238 allows the seat 214 to translate in the lateral direction of the aircraft.

As also shown in FIG. 25, the seat 214 includes two reclining arms 248, 250. The front ends of the reclining arms 248, 250 pivotally connect to the reclining mechanism box 230 at a bore 252 in the reclining mechanism box 230. The reclining arms 248, 250 are connected to the reclining mechanism box 230 in a manner permitting the reclining arms 248, 250 to pivot around an axis defined by the bore 252. In this manner, the seat 214 may recline to a plurality of positions.

Each of the reclining arms 248, 250 include upper segments 254, 256, which are pivotally connected via respective pivots 258, 260. The pivots 258, 260 permit the upper segments 254, 256 to change their angular positions with respect to the reclining arms 248, 250, thereby enhancing the comfort of the seat 214.

With continued reference to FIG. 25, the seat pan 228 includes two protrusions 262, 264 that engage slots 266, 268 in the armrest 224. The other side of the seat pan 228 also includes two protrusions that engage slots in the armrest 226. The protrusions 262, 264 and slots 266, 268 cooperate to adjust the height of the armrest 224 with respect to the seat cushion 222. This operation is discussed above in connection with other embodiments of the seat of the present invention and, therefore, further discussion is not repeated here.

Concerning the swivel 232 and the tracking device 234, both are contemplated to be lockable in any of a variety of different positions. Accordingly, the occupant of the seat 214 may adjust the seat 214 into a comfortable position and lock the seat 214 into the selected position.

With respect to the various embodiments described for the present invention, features described for one embodiment may be applied to other embodiments without departing from the scope of the present invention. Accordingly, the discussion of specific features with respect to one embodiment should not be understood to be limited solely to that embodiment.

As noted above, the present invention encompasses a broad scope. Any discussion of specific details in connection with embodiments is not intended to be limiting of the invention. To the contrary, the specific embodiments described above are intended to illustrate the breadth of the present invention.

What is claimed is:

1. A vehicle seat, comprising:
a seat comprising
 a seat pan, having a seat pan front edge and a seat pan rear edge;
 a backrest, having a backrest top edge and a backrest bottom edge, wherein the backrest bottom edge is articulately disposed adjacent to the seat pan rear edge and wherein the seat pan and the backrest are positionable with respect to one another such that the seat is configurable into at least one of a taxi, takeoff and landing position, a napping position, and a sleeping position;
 a swivel disposed beneath and supporting the seat, permitting the seat to rotate about a pivotal axis; and
 base tracking disposed beneath and supporting the seat, permitting the seat to move in a lateral and a longitudinal direction;
a first control being provided to lock and unlock movement of the seat in at least one of the lateral and the longitudinal directions; and
a second control being provided to lock and unlock the swivel, wherein the swivel is permitted to be unlocked while movement of the seat in the lateral and the longitudinal direction is locked,
wherein at least one of the first and second controls also locks and unlocks a recline mechanism that permits adjustment of a recline position.

2. The seat of claim 1, further comprising:
a third control positioned beneath the seat pan, the third control being a manual override.

3. The vehicle seat of claim 2, wherein the third control is a foot-actuated lever.

4. The seat of claim 1, further comprising:
a lumbar cushion, with a lumbar cushion top edge and a lumbar cushion bottom edge, wherein the lumbar cushion bottom edge is articulately disposed adjacent to the seat pan rear edge and the lumbar cushion top edge is articulately disposed adjacent to the backrest bottom edge.

5. The vehicle seat of claim 1, wherein both the first and second controls lock and unlock the recline mechanism.

6. The vehicle seat of claim 1, wherein the first and second controls are finger-actuated levers.

7. The vehicle seat of claim 1, wherein the first and second controls are electrical switches.

8. The vehicle seat of claim 1, further comprising:
a pressure sensor disposed at least within the seat pan, the pressure sensor being configured to detect a weight of an occupant of the seat.

9. A method of operating the seat according to claim 8, in an aircraft, comprising:
detecting the weight of the occupant;
detecting if the aircraft is in a taxi, takeoff, and landing mode of operation; and
if the aircraft is not in the taxi, takeoff, and landing mode of operation, receiving input from the second control, thereby permitting the seat to transition from the taxi, takeoff and landing position to the napping position or any position intermediate thereto.

10. The method of claim 9, further comprising:
locking the seat when the weight of the occupant fails to exceed a minimum threshold weight.

11. The method of claim 9, further comprising:
if the aircraft is not in the taxi, takeoff, and landing mode of operation, also receiving input from the second control, thereby permitting the seat to swivel.

12. The method of claim 9, further comprising:
if the aircraft is not in the taxi, takeoff, and landing mode of operation, receiving input from the first control, thereby permitting the seat to move at least one of laterally or longitudinally with respect to a centerline of the aircraft.

13. The method of claim 9, further comprising:
if the aircraft is not in the taxi, takeoff, and landing mode of operation, receiving input from the third control, thereby permitting the seat to transition to the sleeping position.

14. The vehicle seat of claim 1, wherein the seat pan front edge defines a first pivot point and the seat pan rear edge defines a second pivot point.

15. The seat of claim 14, wherein the first pivot point remains in a substantially fixed position for the taxi, takeoff and landing position, the napping position, and the sleeping position.

16. The vehicle seat of claim 1, wherein the seat further comprises a headrest, having a headrest top edge and a headrest bottom edge, wherein the headrest bottom edge is articulately disposed adjacent to the backrest top edge and wherein the seat pan, the backrest, and the headrest are positionable with respect to one another such that the seat is configurable into at least one of a taxi, takeoff and landing position, a napping position, and a sleeping position.

17. The vehicle seat of claim 1, wherein the seat further comprises first and second armrests disposed on either side of the seat pan.

18. The vehicle seat of claim 17, wherein the first control is positioned in the first armrest.

19. The vehicle seat of claim 17, wherein the second control is positioned in the second armrest.

20. A vehicle seat, comprising:
a seat comprising
  a seat pan, having a seat pan front edge and a seat pan rear edge;
  a backrest, having a backrest top edge and a backrest bottom edge, wherein the backrest bottom edge is articulately disposed adjacent to the seat pan rear edge and wherein the seat pan and the backrest are positionable with respect to one another such that the seat is configurable into at least one of a taxi, takeoff and landing position, a napping position, and a sleeping position;
  a swivel disposed beneath and supporting the seat, permitting the seat to rotate about a pivotal axis; and
  base tracking disposed beneath and supporting the seat, permitting the seat to move in a lateral and a longitudinal direction;
a first control being provided to lock and unlock movement of the seat in at least one of the lateral and the longitudinal directions; and
a second control being provided to lock and unlock the swivel, wherein the swivel is permitted to be unlocked while movement of the seat in the lateral and the longitudinal direction is locked,
wherein the seat pan front edge defines a first pivot point and the seat pan rear edge defines a second pivot point, and
wherein the first pivot point remains in a substantially fixed position for the taxi, takeoff and landing position, the napping position, and the sleeping position.

21. The seat of claim 20, further comprising:
a third control positioned beneath the seat pan, the third control being a manual override.

22. The vehicle seat of claim 20, wherein the second control also locks and unlocks the recline mechanism.

23. The vehicle seat of claim 20, wherein the first and second controls are one of finger-actuated levers and electrical switches.

24. The vehicle seat of claim 20, further comprising:
a pressure sensor disposed at least within the seat pan, the pressure sensor being configured to detect a weight of an occupant of the seat.

25. A method of operating the seat according to claim 24, in an aircraft, comprising:
detecting the weight of the occupant;
detecting if the aircraft is in a taxi, takeoff, and landing mode of operation; and
if the aircraft is not in the taxi, takeoff, and landing mode of operation, receiving input from the second control, thereby permitting the seat to transition from the taxi, takeoff and landing position to the napping position or any position intermediate thereto.

* * * * *